(12) United States Patent
Jung et al.

(10) Patent No.: US 11,638,172 B2
(45) Date of Patent: Apr. 25, 2023

(54) INTRALINK BASED SESSION NEGOTIATION AND MEDIA BIT RATE ADAPTATION

(71) Applicant: Meta Platforms Technologies, LLC, Menlo Park, CA (US)

(72) Inventors: Kyunghun Jung, Sunnyvale, CA (US); Kyungho Kim, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 30 days.

(21) Appl. No.: 17/399,329

(22) Filed: Aug. 11, 2021

(65) Prior Publication Data

US 2022/0394539 A1 Dec. 8, 2022

Related U.S. Application Data

(60) Provisional application No. 63/195,742, filed on Jun. 2, 2021.

(51) Int. Cl.
*H04W 28/02* (2009.01)
*H04W 16/14* (2009.01)
(Continued)

(52) U.S. Cl.
CPC ....... *H04W 28/0236* (2013.01); *H04L 43/087* (2013.01); *H04L 43/0847* (2013.01);
(Continued)

(58) Field of Classification Search
CPC ......... H04W 28/0231; H04W 28/0236; H04W 4/20; H04W 28/12; H04W 28/16;
(Continued)

(56) References Cited

U.S. PATENT DOCUMENTS

| 8,422,444 B2 * | 4/2013 | Gunawardena ....... H04W 72/06 370/329 |
| 10,771,294 B1 * | 9/2020 | Bhat Noojady Krishna ............... H04L 65/70 |

(Continued)

OTHER PUBLICATIONS

International Search Report and Written Opinion for International Application No. PCT/US2022/031493, dated Aug. 19, 2022, 8 pages.

*Primary Examiner* — Warner Wong
(74) *Attorney, Agent, or Firm* — Foley & Lardner LLP

(57) ABSTRACT

Described embodiments provide systems and methods for adapting/negotiating media information. A first device may determine a channel quality of a wireless channel in an unlicensed spectrum between the first device and a first tethered device. The first device may determine a first bit rate supportable on the wireless channel according to the channel quality. The first device may send, to the second device, an offer message with an offered bit rate comprising a lower of the first bit rate or a second bit rate supportable by a connection between the first device and the second device at least partially across a licensed spectrum. The first device may receive, from the second device, a reply message with a reply bit rate that is less than or equal to the offered bit rate, to apply to wireless communication across at least the first tethered device, the first device and the second device.

20 Claims, 15 Drawing Sheets

(51) Int. Cl.
  *H04L 43/0823* (2022.01)
  *H04L 43/087* (2022.01)
  *H04W 24/08* (2009.01)
  *H04L 1/00* (2006.01)
  *H04W 28/22* (2009.01)
  *H04L 47/263* (2022.01)

(52) U.S. Cl.
  CPC ........... *H04W 16/14* (2013.01); *H04W 24/08* (2013.01); *H04L 1/0002* (2013.01); *H04L 47/263* (2013.01); *H04W 28/22* (2013.01)

(58) Field of Classification Search
  CPC ..... H04W 28/18; H04W 28/20; H04W 28/22; H04L 43/08; H04L 43/0823; H04L 43/847; H04L 43/0852; H04L 43/087; H04L 43/0894; H04L 1/0002; H04L 2012/5636; H04L 47/263; H04L 69/24
  See application file for complete search history.

(56) References Cited

U.S. PATENT DOCUMENTS

| | | | |
|---|---|---|---|
| 2010/0034106 A1* | 2/2010 | Hu | H04L 43/0894 370/252 |
| 2016/0057647 A1* | 2/2016 | Sullivan | H04L 1/0016 370/253 |
| 2017/0085420 A1* | 3/2017 | Singh | H04L 41/0803 |
| 2019/0037462 A1 | 1/2019 | Chowdhury et al. | |
| 2019/0215729 A1 | 7/2019 | Oyman et al. | |
| 2020/0044769 A1 | 2/2020 | Neelisetty et al. | |
| 2020/0075032 A1* | 3/2020 | Joseph | G10L 19/002 |
| 2021/0084583 A1* | 3/2021 | Niu | H04W 16/14 |
| 2021/0352560 A1* | 11/2021 | Cai | H04W 36/36 |
| 2022/0303332 A1* | 9/2022 | Szász | H04L 65/80 |

* cited by examiner

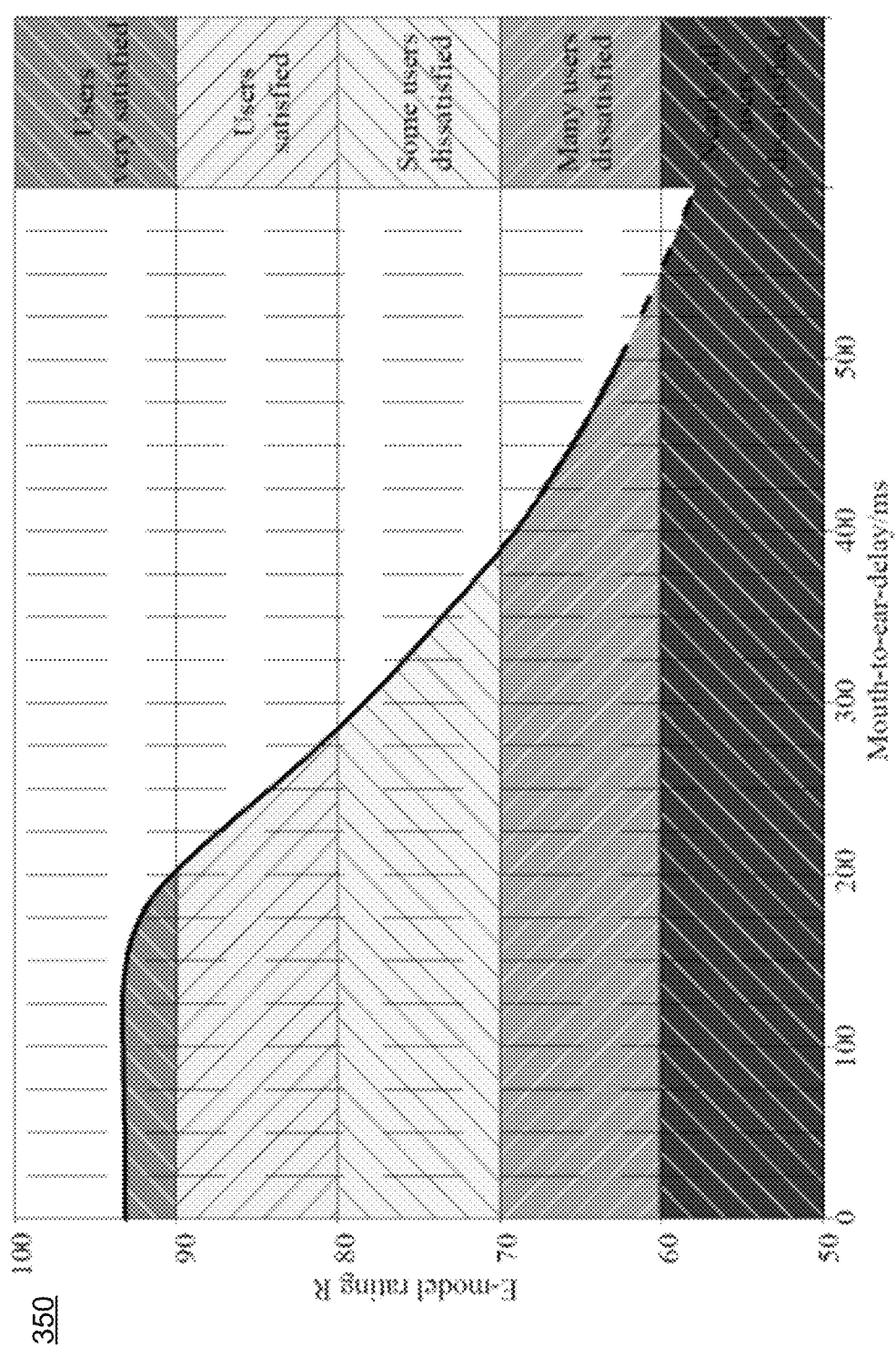
FIG. 3B – Determination of the effects of absolute delay by the E-model

FIG. 7A

RTP header 700

| V | P | E | CC | M, Payload type | Sequence number |
|---|---|---|---|---|---|
| Timestamp ||||||
| Synchronization source (SSRC) identifier ||||||
| Contributing source (CSRC) identifier ||||||

FIG. 7B

Temporary maximum media bit-rate request (TMMBR) message

| V | P | Subtype | PT | Length |
|---|---|---|---|---|
| SSRC of packet source |||||
| SSRC of media source |||||
| Exp | Mantissa ||| Measured overhead |

INTRALINK BASED SESSION NEGOTIATION AND MEDIA BIT RATE ADAPTATION

CROSS-REFERENCE TO RELATED APPLICATION

This application claims priority to and the benefit of U.S. Provisional Application No. 63/195,742, filed Jun. 2, 2021, entitled "INTRALINK BASED SESSION NEGOTIATION AND MEDIA BIT RATE ADAPTATION", which is incorporated herein by reference in its entirety for all purposes

FIELD OF THE DISCLOSURE

The present application generally relates to systems and methods of determining a bit rate supportable across multiple links, including but not limited to systems and methods for adapting the bit rate across multiple wireless links according to channel conditions of the wireless links.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by an artificial reality computing device communicatively coupled to the HWD. In one example, the HWD includes various sensors that detect a location and/or orientation of the HWD, and transmits the detected location and/or orientation of the HWD to the computing device. The computing device can determine a user's view of the space of the artificial reality according to the detected location and/or orientation of the HWD, and generate image data indicating an image of the space of the artificial reality corresponding to the user's view. The computing device can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). A latency between a movement of the user wearing the HWD and an image displayed corresponding to the user movement can cause judder, which may result in motion sickness and can degrade the user experience.

SUMMARY

Various embodiments disclosed herein are related to systems and methods of negotiating session details and/or adapting media information (e.g., a media bit-rate, media throughput, video resolution, and/or other information) according to (or based on) a condition/quality of a wireless channel (e.g., intralink and/or other communication links) between at least one device (e.g., user equipment (UE), wireless device, mobile device, and/or other computing devices) and at least one tethered device (e.g., a head wearable display (HWD), such as head mounted display/device (HMD)). For example, for services or applications with latency limitations or requirements (e.g., AR/VR or location tracking applications), it may be beneficial to consider the status of wireless connectivity (e.g., for intralink and/or interlink) when configuring the services or applications (e.g., such that the link between HWD/glasses and a phone/computing-device/soft-access-point is not overly loaded). A first device (e.g., UE) may communicate with a second device (e.g., another UE) via a connection (e.g., interlink, wireless connection, wired connection, internet backbone connection, and/or other connections). The connection may be, at least partially, across a licensed spectrum, and therefore, can meet or support a certain quality of service (QoS). In certain scenarios, a wireless channel (e.g., non-QoS area, in an unlicensed band for instance) between at least one device (e.g., UE) and at least one tethered device (e.g., HWD) may be unable to support the QoS of the connection (e.g., QoS area, in a licensed band for instance) between the first device and the second device. As such, the quality of the wireless channel may fail to match (e.g., meet or exceed) the channel quality/condition of the connection between the first device and the second device, thereby affecting the experience of a user. For instance, a degradation in channel quality from the connection (e.g., QoS area) to the wireless channel (e.g., non-QoS area) may affect the performance of real-time applications that lack or do not support long buffering (e.g., video-call application) or retransmission of lost data. To mitigate the effects of a degradation and/or loss in channel quality between a QoS area (e.g., licensed spectrum) and a non-QoS area (e.g., unlicensed spectrum), the systems and methods presented herein may consider, assess determine, and/or evaluate the quality (and/or other factors) of at least one wireless channel (e.g., between a device and a tethered device) when negotiating and/or determining the details of a session (e.g., session between the device(s) and the tethered device(s)). Furthermore, the embodiments disclosed herein may adapt, change, adjust, and/or modify media information (e.g., media bit-rate and/or media resolution) of the session according to the quality of the at least one wireless channel (e.g., at least one intralink).

A first device may determine a channel quality of a wireless channel in an unlicensed spectrum (e.g., intralink) between the first device and a first tethered device (e.g., glasses and/or HWD). The first device may determine a first bit rate supportable on the wireless channel according to the channel quality. The first device may send an offer message to the second device, the offer message with an offered bit rate for the media. The offered bit rate may comprise a lower of the first bit rate or a second bit rate. The second bit rate may be supportable by a connection between the first device and the second device that is at least partially across a licensed spectrum (e.g., interlink). The first device may receive a reply message with a reply bit rate from the second device. The reply bit rate may be less than or equal to the offered bit rate. The reply bit rate may be to apply to wireless communication across at least the first tethered device, the first device and the second device.

In some embodiments, determining the channel quality may comprise determining, by the first device, jitter of at least one beacon signal between the first device and the first tethered device. In some embodiments, the first device may determine an amount of undelivered or dropped packets between the first device and the first tethered device, to determine the channel quality. In some embodiments, the wireless channel may comprise a channel for cellular, wireless local area network (WLAN), narrowband (e.g., Bluetooth and/or Bluetooth Low Energy (BLE)) or ultra-wideband (UWB) communications. In some embodiments, the first bit rate, the offered bit rate or the reply bit rate may comprise a bit rate for communicating at least one of: video data, augmented reality data or virtual reality data. In some embodiments, the reply bit rate may comprise a lower of: the offered bit rate, or a bit rate supportable on a wireless channel in the unlicensed spectrum between the second device and a second tethered device.

In some embodiments, the first device may receive another offer message with another offered bit rate from the second device. In some embodiments, the first device may send another reply message with another reply bit rate to the second device. In some embodiments, the another bit rate may be less than or equal to the another offered bit rate. In some embodiments, the first device may determine an updated bit rate supportable on the wireless channel. In some embodiments, the first device may determine the another reply bit rate as a lower of: the updated bit rate, the another offered bit rate, or the second bit rate supportable by the connection between the first device and the second device.

Various embodiments disclosed herein are related to a method of negotiating session details and/or adapting media information according to a quality of at least one wireless channel between a device and a tethered device. A first device (e.g., a UE) may receive an offer message with an offered bit rate from a second device (e.g., another UE). The first device may determine a first bit rate supportable on a wireless channel in an unlicensed spectrum between the first device and a first tethered device (e.g., intralink). The first device may determine a reply bit rate as a lower of: the first bit rate, the offered bit rate, and a second bit rate supportable by a connection between the first device and the second device. The connection between the first device and the second device may be at least partially across a licensed spectrum. The first device may send a reply message with the reply bit rate to the second device. The reply bit rate may be to apply to wireless communication across at least the first tethered device, the first device and the second device.

In some embodiments, the first device may receive another offer message with another offered bit rate from the second device. In some embodiments, the first device may send another reply message with another reply bit rate to the second device. In some embodiments, the another reply rate may be less than or equal to the another offered bit rate. In some embodiments, the first device may determine an updated bit rate supportable on the wireless channel. In some embodiments, the first device may determine the another reply bit rate as a lower of: the updated bit rate, the another offered bit rate, or the second bit rate supportable by the connection between the first device and the second device. In some embodiments, the first device may determine an updated bit rate supportable on the wireless channel. In some embodiments, the first device may determine another offered bit rate as a lower of: the updated bit rate, or the second bit rate supportable by the connection between the first device and the second device.

In some embodiments, the first device may send another offer message with the another offered bit rate to the second device. In some embodiments, the first device may receive another reply message with another reply bit rate that is less than or equal to the another offered bit rate from the second device. In some embodiments, the another reply bit rate may be to apply to wireless communication across at least the first tethered device, the first device and the second device. In some embodiments, determining a channel quality may comprise determining, by the first device, jitter of at least one beacon signal between the first device and the first tethered device. In some embodiments, the first device may determine an amount of undelivered or dropped packets between the first device and the first tethered device, to determine the channel quality. In some embodiments, the wireless channel may comprise a channel for cellular, wireless local area network (WLAN), narrowband or ultra-wideband (UWB) communications. In some embodiments, the first bit rate, the offered bit rate or the reply bit rate may comprise a bit rate for communicating at least one of: video data, augmented reality data or virtual reality data.

Various embodiments disclosed herein are related to a first device to negotiate session details and/or adapt media information according to a quality of at least one wireless channel between a device and a tethered device. In some embodiments, the first device may comprise at least one processor. The at least one processor may be configured to determine a channel quality of a wireless channel in an unlicensed spectrum between the first device and a first tethered device. The at least one processor may be configured to determine a first bit rate supportable on the wireless channel according to the channel quality. The at least one processor may be configured to send an offer message with an offered bit rate to a second device. The offered bit rate may comprise a lower of the first bit rate or a second bit rate supportable by a connection between the first device and the second device that is at least partially across a licensed spectrum. The at least one processor may be configured to receive a reply message with a reply bit rate from the second device. The reply bit rate may be less than or equal to the offered bit rate, to apply to wireless communication across at least the first tethered device, the first device and the second device.

In some embodiments, the at least one processor may be configured to determine the channel quality by determining jitter of at least one beacon signal between the first device and the first tethered device. In some embodiments, the at least one processor may be configured to determine an amount of undelivered or dropped packets between the first device and the first tethered device, to determine the channel quality. In some embodiments, the reply bit rate may comprise a lower of: the offered bit rate, or a bit rate supportable on a wireless channel in the unlicensed spectrum between the second device and a second tethered device. In some embodiments, the at least one processor may be configured to receive another offer message with another offered bit rate from the second device. In some embodiments, the at least one processor may be configured to send another reply message with another reply bit rate to the second device. In some embodiments, the another reply bit rate can be less than or equal to the another offered bit rate. In some embodiments, the at least one processor may be configured to determine an updated bit rate supportable on the wireless channel. In some embodiments, the at least one processor may be configured to determine the another reply bit rate as a lower of: the updated bit rate, the another offered bit rate, or the second bit rate supportable by the connection between the first device and the second device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 3B is a graph of the effects of absolute delay on the quality of a conversation across a communication channel, according to an example implementation of the present disclosure.

FIG. 7A is a diagram of a header that can be used for determining, measuring, and/or estimating the channel quality of a wireless channel, according to an example implementation of the present disclosure.

FIG. 7B is a diagram of a message that can be used for asking a device to change a media encoding bit-rate or other information, according to an example implementation of the present disclosure.

DETAILED DESCRIPTION

Figure 1:
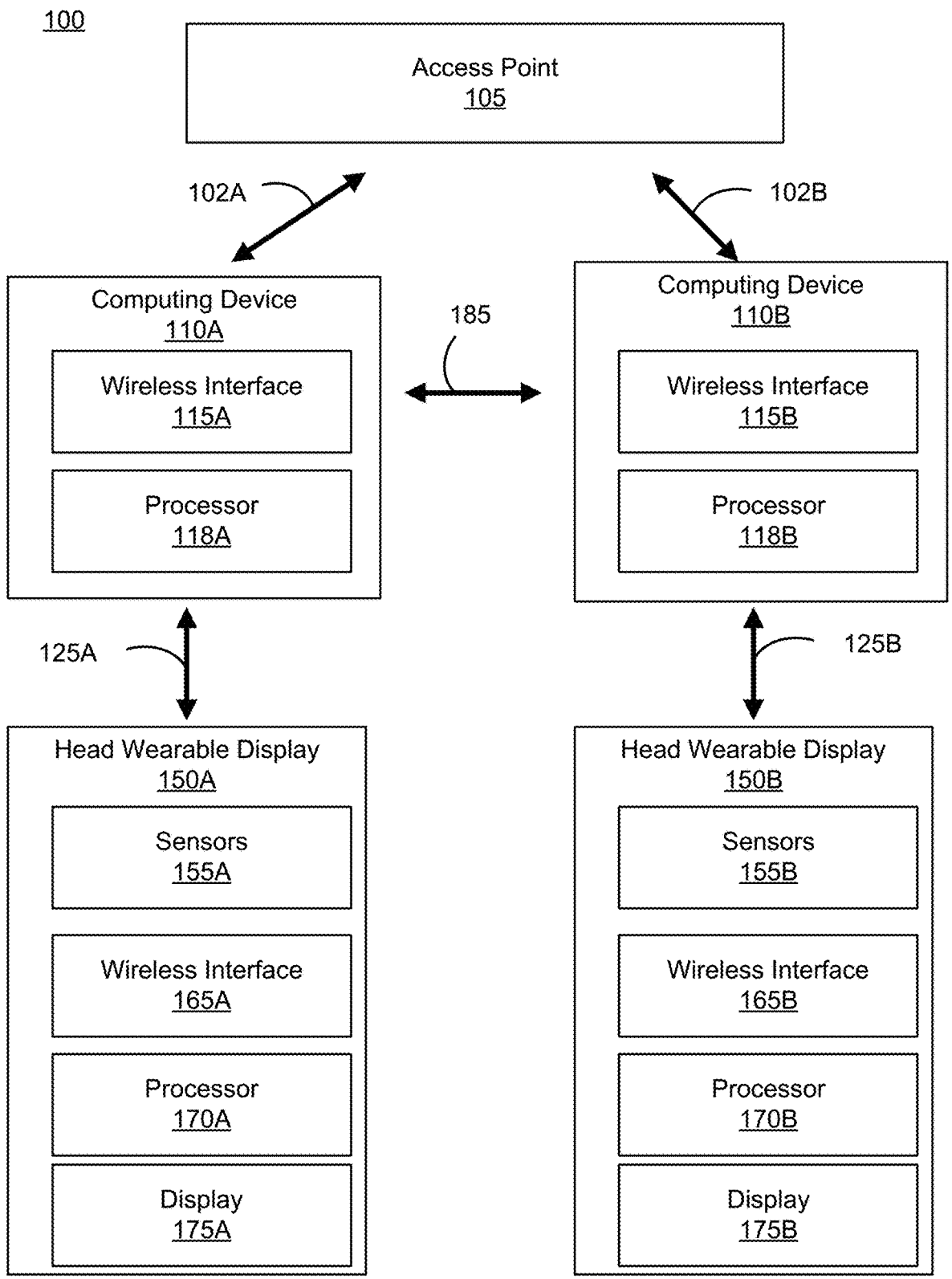
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The systems and methods presented herein include a novel approach for negotiating the details of a session (e.g., negotiating details/parameters of media used or transmitted in a session) and/or adapting media information (e.g., a media bit-rate, a media type, a media resolution, and/or other information) of the session. The novel approach can adapt/ adjust/update the information of the media (e.g., video data, augmented reality data, and/or virtual reality data) and/or negotiate/determine the details of the session based on (or according to) a quality/condition of at least one wireless channel (e.g., intralink) between a device (e.g., UE, wireless device, mobile device, and/or other computing devices) and a tethered device (e.g., HWD).

In some embodiments, a wireless channel (e.g., between the device and the tethered device) can be in an unlicensed or shared spectrum (e.g., unlicensed 5 GHz frequency band). As such, the wireless channel may be unable to support a certain quality of service (QoS) due to interference and/or channel access collisions between devices for instance. For example, the wireless channel may fail to support a predetermined level of packet loss, bit rate, throughput, transmission delay, availability, and/or jitter according to a certain QoS. If the wireless channel does not support an established QoS (e.g., referred to as a non-QoS area in FIG. 4), the quality of the wireless channel may be unable to match (e.g., meet or exceed) the channel quality of a connection that supports said QoS (e.g., referred to as a QoS area in FIG. 4). For instance, a connection between a first device and a second device (e.g., interlink) may be, at least partially, across a licensed spectrum, and as such, the connection can support a certain level of QoS. However, the quality of a wireless channel (e.g., non-QoS area) between the first device and a first tethered device (or a second device and second tethered device) may be unable to meet or exceed the channel quality of the connection (e.g., QoS area) across the licensed spectrum (e.g., connection between the first device and the second device). As such, various embodiments disclosed herein propose to determine, assess, evaluate, and/or consider the quality of at least one wireless channel (e.g., intralink between a UE and a HWD) when negotiating the details of a session (e.g., using IP multimedia subsystem (IMS) framework) and/or adapting the information of the media used or conveyed in the session.

In some embodiments, a first device (e.g., a first UE) and a second device (e.g., a second UE) may negotiate/determine the details of a session (e.g., a session between the first and second device), and/or adapt the media information of the session (e.g., a bit rate), according to a channel quality (and/or other channel properties, such as channel bandwidth, signal-to-noise ratio) of at least one wireless channel (e.g., in an unlicensed spectrum) and/or a network connection (e.g., at least partially across a licensed spectrum) between the devices. For example, the first device may determine/ measure/identify a channel quality of at least one wireless channel. The at least one wireless channel may include or correspond to a wireless channel in an unlicensed spectrum between the first device and a first tethered device (e.g., a first HMD), and/or a wireless channel in an unlicensed spectrum between the second device and a second tethered device (e.g., a second HMD). According to (or based on) the determined channel quality, the first device may determine/ identify/configure a bit rate (and/or other media information), wherein the bit rate is supported on the wireless channel(s) (e.g., non-QoS area). By using a plurality of messages (e.g., session description protocol (SDP) offers and/or SDP answers), the first device and the second device can exchange, provide, indicate, specify, negotiate and/or communicate one or more bit rates (and/or other media information) with each other, such as an offered bit rate and/or a reply bit rate. The offered bit rate and/or the reply bit rate can be determined according to a channel quality of the at least one wireless channel (e.g., non-QoS area) and/or a channel quality of the connection between the devices (e.g., QoS area). In some embodiments, the first device and/or the second device may determine or agree to apply the reply bit rate (e.g., less than or equal to the offered bit rate) to wireless communication across at least the first tethered device, the second tethered device, the first device and/or the second device.

In one example, the devices (e.g., the first device and the second device) may negotiate/adapt the details of the session (e.g., media information, such as bit rate, media type, and/or resolution) such that a media information (media setting or configuration, e.g., a bit-rate and/or a resolution) applied to the connection between the devices corresponds to (e.g., matches or is within a defined range/extent of) a media information (e.g., a bit-rate and/or a resolution) applied to the at least one wireless channel between a device and a tethered device. For instance, a first device (e.g., a first UE) may support a video bit rate of up to 3,000 kbps (or other bit rates) and/or a video resolution of up to 1920×1080 and/or 1280×720 (or other video resolutions). The first device may configure, create, and/or generate an original/initial SDP offer (or other messages) indicating the bit rate and/or resolution supported by the first device, as illustrated below:
m=video 49154 RTP/AVP 106
b=AS:3000
b=RS:0
b=RR:2500
a=rtpmap:106 H265/90000
a=fmtp:106 profile-id=1; level-id=93; \
a=imageattr:106 send [x=1920,y=1080][x=1280,y=720] recv [x=1920,y=1080][x=1280,y=720]
a=sendrecv However, the first device may determine that the wireless channel (e.g., in an unlicensed spectrum) between the first device and the first tethered device supports a video bit rate of up to 1,500 kbps and/or a video resolution of up to 1280×720 (e.g., according to or supportable/limited by a channel quality of the wireless channel determined/measured by the first device). As such, the first device may generate/adjust the SDP offer (e.g., an offer message), and/or send/transmit said SDP offer to the second device. The SDP offer may include, provide, specify, and/or indicate a lower of the bit-rate/resolution supported by the connection between the first and second devices (e.g., 3,000 kbps and/or 1920×1080 and 1280×720) and the bit-rate/resolution supported by the wireless channel (e.g., 1,500 kbps and/or 1280×720) between the first device and the first tethered device. According to the current example, the SDP offer may have, provide, specify, and/or indicate a video bit-rate of 1,500 kbps (e.g., 1,500 kbps≤3,000 kbps) and/or a video resolution of 1280×720, as illustrated below:
m=video 49154 RTP/AVP 106
b=AS:1500
b=RS:0
b=RR:2500
a=rtpmap:106 H265/90000
a=fmtp:106 profile-id=1; level-id=93; \
a=imageattr:106 send [x=1280,y=720] recv [x=1280,y=720]
a=sendrecv Responsive to receiving the SDP offer, the second device can measure/determine the quality of the wireless channel (e.g., in an unlicensed spectrum) between the second device and a second tethered device (e.g., a second HMD). The second device may determine that the wireless channel (e.g., between the second device and the second tethered device) supports a video bit-rate of up to 1,800 kbps and/or a video resolution of up to 1280×720 (e.g., according to a quality/condition of the wireless channel determined by the second device). Although the second device can support a bit-rate of up to 3,000 kbps and/or the wireless channel can support a bit rate of up to 1,800 kbps, the second device may determine to send, communicate, and/or specify a video bit-rate of 1,500 kbps (e.g., a reply bit rate) to the first device via a SDP answer (e.g., a reply message). Therefore, the SDP answer may indicate, provide, specify, include, and/or indicate a bit-rate/resolution that is the lower of the bit-rate/resolution provided by the SDP offer, the bit-rate/resolution supported by the second device, and/or the bit-rate/resolution supported by the wireless channel between the second device and the second tethered device. According to the example, the SDP answer can indicate/specify a video bit-rate of 1,500 kbps (1,500 kbps≤1,800 kbps≤3,000 kbps) and/or a video resolution of 1280×720, as indicated below:
m=video 49154 RTP/AVP 106
b=AS:1500
b=RS:0
b=RR:2500
a=rtpmap:106 H265/90000
a=fmtp:106 profile-id=1; level-id=93; \
a=imageattr:106 send [x=1280,y=720] recv [x=1280,y=720]
a=sendrecv As such, the SDP answer may confirm, include and/or specify a bit rate (e.g., a reply bit rate) that is less than or equal to the bit rate provided by the SDP offer (e.g., 1,500 kbps≤1,500 kbps). The bit rate of the SDP answer can be supported by the session, channel(s), and/or connection(s), according to (e.g., constrained by) the channel quality of the wireless channel(s). The bit rate and/or video resolution provided via the SDP answer can be applied to the wireless communication across at least the first tethered device, the first device, and/or the second device.

In view of the above discussion regarding negotiating and/or adapting the media information of a session (or other session details), a process and/or system for performing said negotiation/adaptation may be beneficial, as further explained in the following passages. FIG. 1 is a block diagram of an example artificial reality system environment 100, in which the details of a session (e.g., media information of the session) between at least one device 110 (e.g., UE) and at least one tethered device 150 (e.g., HWD) can be adapted and/or negotiated. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. In some embodiments, the device(s) 110 and/or the tethered device(s) 150 can negotiate/adapt the media information of a session (e.g., a bit rate, a resolution, a type of media, and/or other information) according to (or based on) a quality of at least one wireless channel (e.g., an intralink in an unlicensed spectrum) and/or a channel quality of a connection/link 102 (e.g., an interlink, at least partially, in a licensed spectrum) between a first device 110A and a second device 110B. The at least one wireless channel may include or correspond to a wireless channel/link 125A, 125B between a device 110A, 110B (e.g., a computing/stage device) and a tethered device 150A, 150B (e.g., a HWD).

The access point 105 may be a router or any network device allowing one or more computing devices 110 and/or one or more HWDs 150 to access a network (e.g., the Internet). The access point 105 may be replaced by any communication infrastructure (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations.

In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 2:
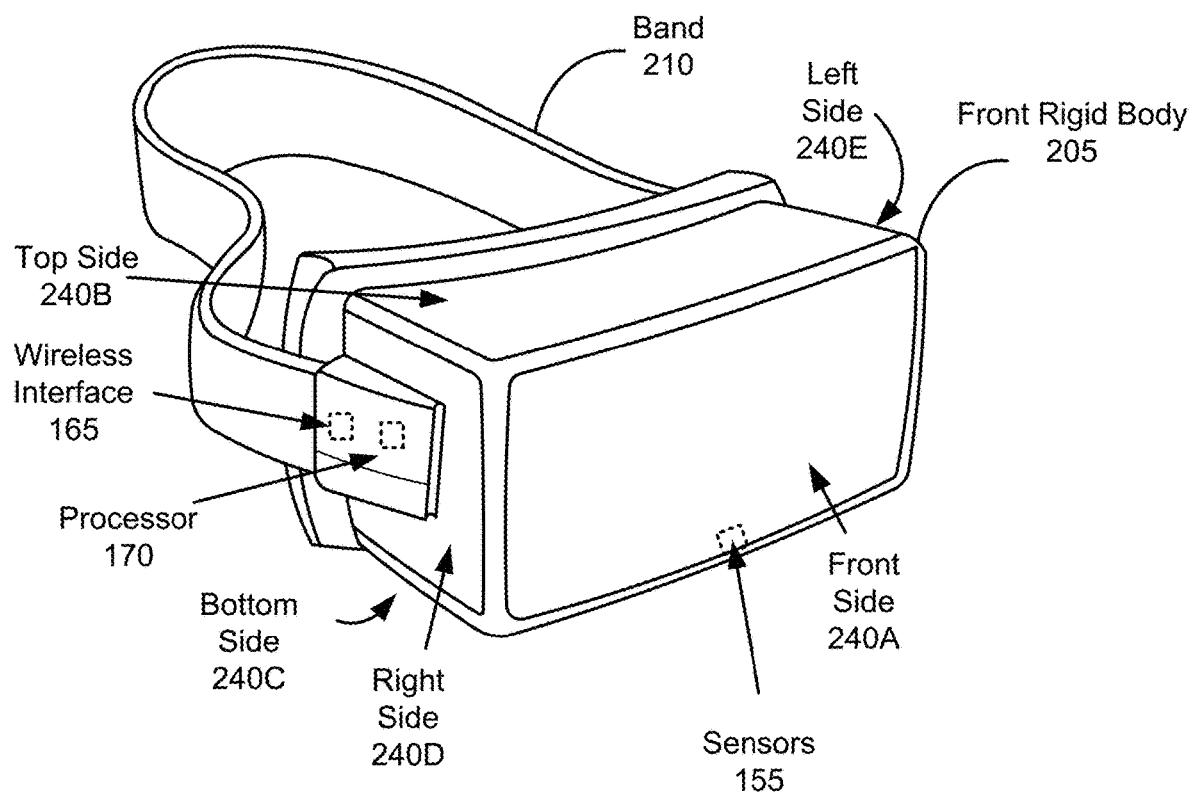
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not be visible to the user. In other embodiments, the HWD 150 has a different configuration than shown in FIG. 2. For example, the wireless interface 165, the processor 170, and/or the sensors 155 may be in different locations than shown in FIG. 2.

Figure 3A:
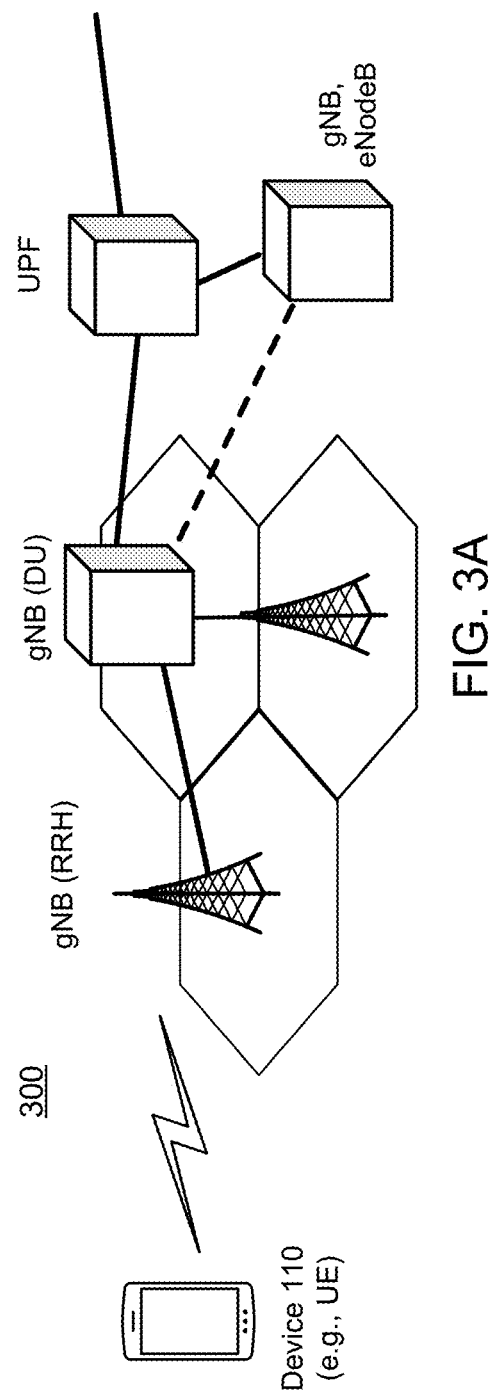
FIG. 3A is a diagram of a communication network in which techniques disclosed herein may be implemented, according to an example implementation of the present disclosure.

FIG. 3A illustrates an example wireless communication infrastructure, environment and/or system, 300 in which techniques disclosed herein may be implemented, in accordance with an embodiment of the present disclosure. In the following discussion, the wireless communication infrastructure 300 may include any wireless network, such as a cellular network or a narrowband Internet of things (NB-IoT) network. Such an example system 300 can include one or more communication nodes (e.g., gNB (RRH), gNB (DU) in 5G, eNodeB in LTE), at least one function (e.g., user plane function (UPF)), and/or at least one user equipment (UE) device (also referred to as a computing device 110) that can communicate with each other via communication links/channels. In FIG. 3A, the communication node(s) and/or the UE can be contained within a respective geographic boundary of a cell. Each cell may include at least one communication node operating at its allocated bandwidth to provide adequate coverage to its intended users. Such communication node(s) may be capable of wireless and/or wired communications, in accordance with various embodiments of the present solution.

In some embodiments, the performance or service level of a system/network (such as system 300 and/or the example artificial reality system 100) can be described and/or measured according to a quality of service (QoS). The QoS can be determined according to (or based on) one or more parameters that indicate/quantify/measure an aspect of a system's performance. For instance, the one or more parameters of the QoS may comprise a bit rate, a delay (e.g., mouth-to-ear delay), a packet loss rate, and/or other parameters that measure/quantify the performance of the system. To meet or support an established/determined QoS, the one or more parameters of the QoS can remain within an acceptable range of values (e.g., a range that guarantees the established QoS). However, improving a value of a QoS parameter above a predetermined level (e.g., to improve the QoS of a system) may fail to improve the performance of the system. For instance, FIG. 3B illustrates a graph 350 of the effects of absolute delay (e.g., an example QoS parameter) on the quality of a conversation by the E-model, according to an example embodiment. The graph 350 includes a y-axis indicating a mouth-to-ear delay (e.g., a connection's end-to-end transmission and processing delay, in units of ms) and an x-axis indicating an E-model rating R. As illustrated in graph 350, reducing and/or decreasing the value of the mouth-to-ear delay to a value that is below 280 ms can fail to improve the quality of a conversation, and as such, may fail to noticeably increase the QoS.

Figure 4:
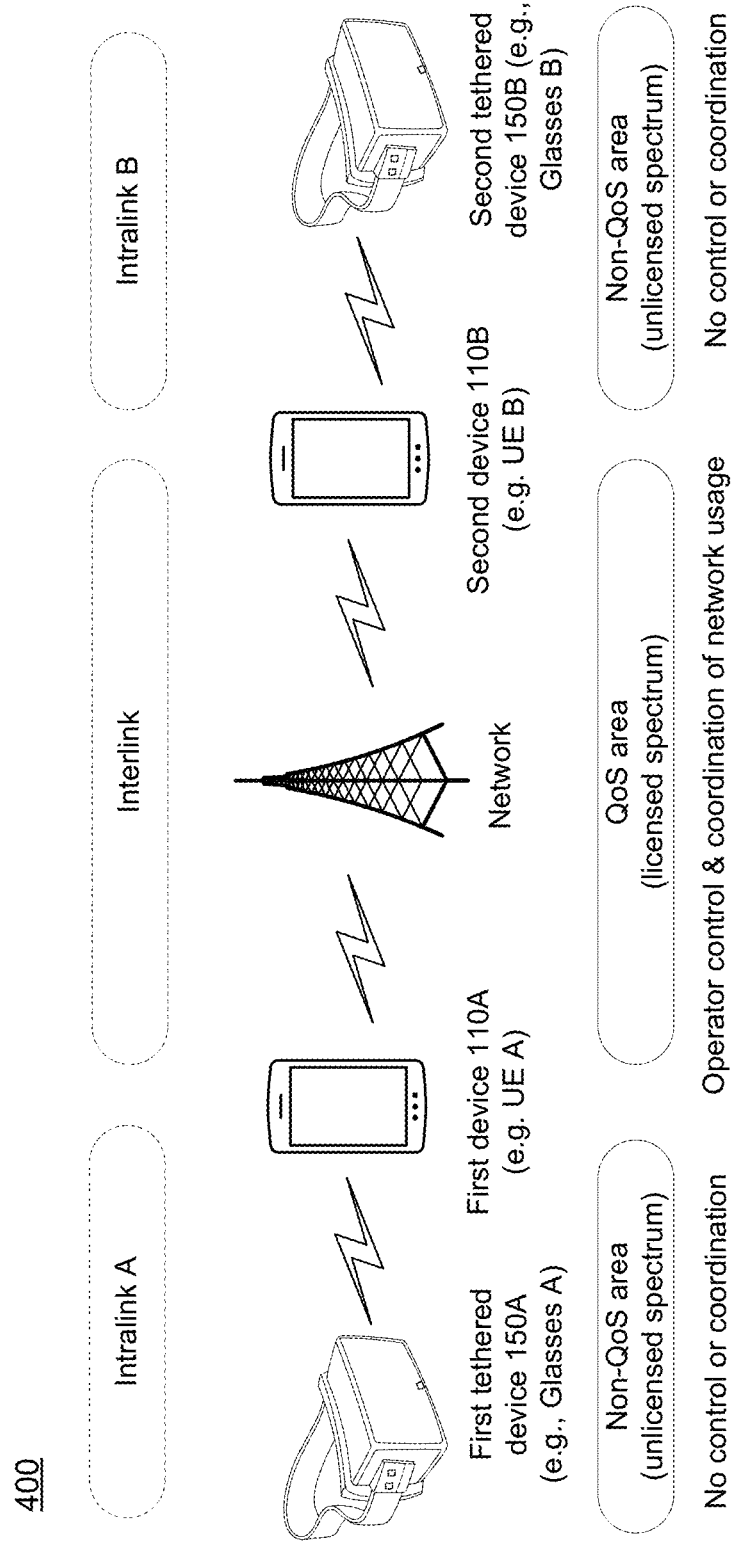
FIG. 4 is a block diagram of a system that can partially support and/or meet a QoS, according to an example implementation of the present disclosure.

Referring to FIG. 4, depicted is a block diagram of one example embodiment of a system 400 that can partially support and/or meet a defined QoS. The system 400 may include one or more devices 110 (e.g., a first device 110A and/or a second device 110B) and/or one or more tethered devices 150 (e.g., a first tethered device 150A and/or a second tethered device 150B). Each device 110 (e.g., a UE) may communicate with a tethered device 150 (e.g., a HWD 150) via a wireless channel in an unlicensed spectrum (e.g., intralink). The first device 110A and the second device 110B may communicate with each other via a connection that is, at least partially, across/using a licensed spectrum (e.g., interlink). The connection between the first device 110A and the second device 110B can be under centralized network control and coordination, and as such, the connection may support a certain/defined QoS (e.g., QoS area). For instance, the connection may be, at least partially, across an internet protocol (IP) network backbone. As such, the connection can achieve/ensure minimal delay and/or error rate. In contrast, the wireless channel(s) in the unlicensed spectrum (e.g., WLAN, narrowband and/or UWB communications) may be unable to support the QoS of the connection between the first device 110A and the second device 110B (e.g., non-QoS area). The inability to support the QoS of the connection may be due to the channel quality of the wireless channel(s) (e.g., contributing to increased jitter, delay, and/or error rate compared to the QoS area). To ensure a consistent performance of the system 400 across the QoS areas and the non-QoS areas, the media information (e.g., a bit rate) of the QoS area may be configured to include or correspond to the media information of the non-QoS areas.

Figure 5A:
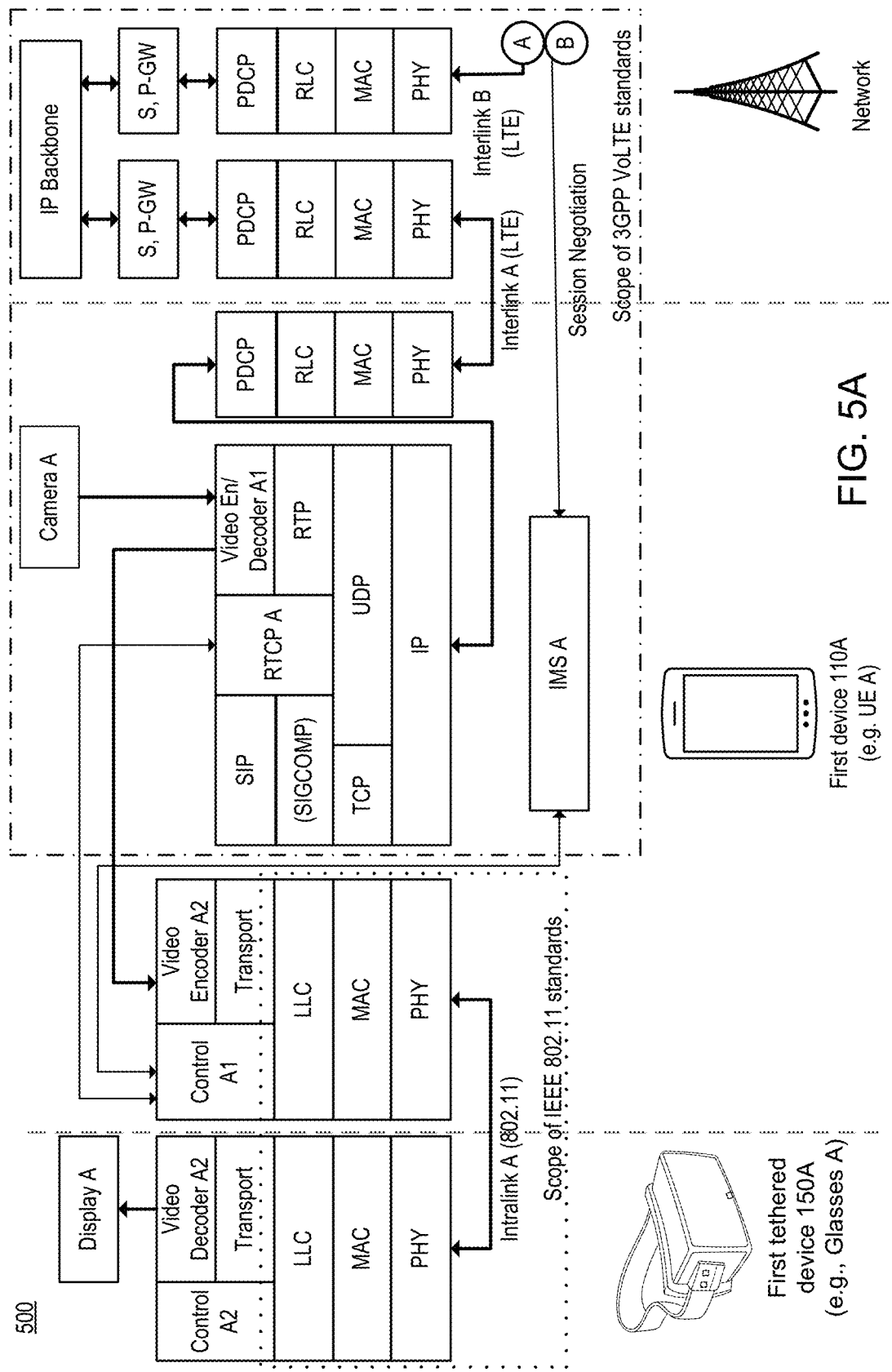
FIGS. 5A-5B include a block diagram of a system for negotiating details of a session and/or adapting media information, according to an example implementation of the present disclosure.
Figure 5B:
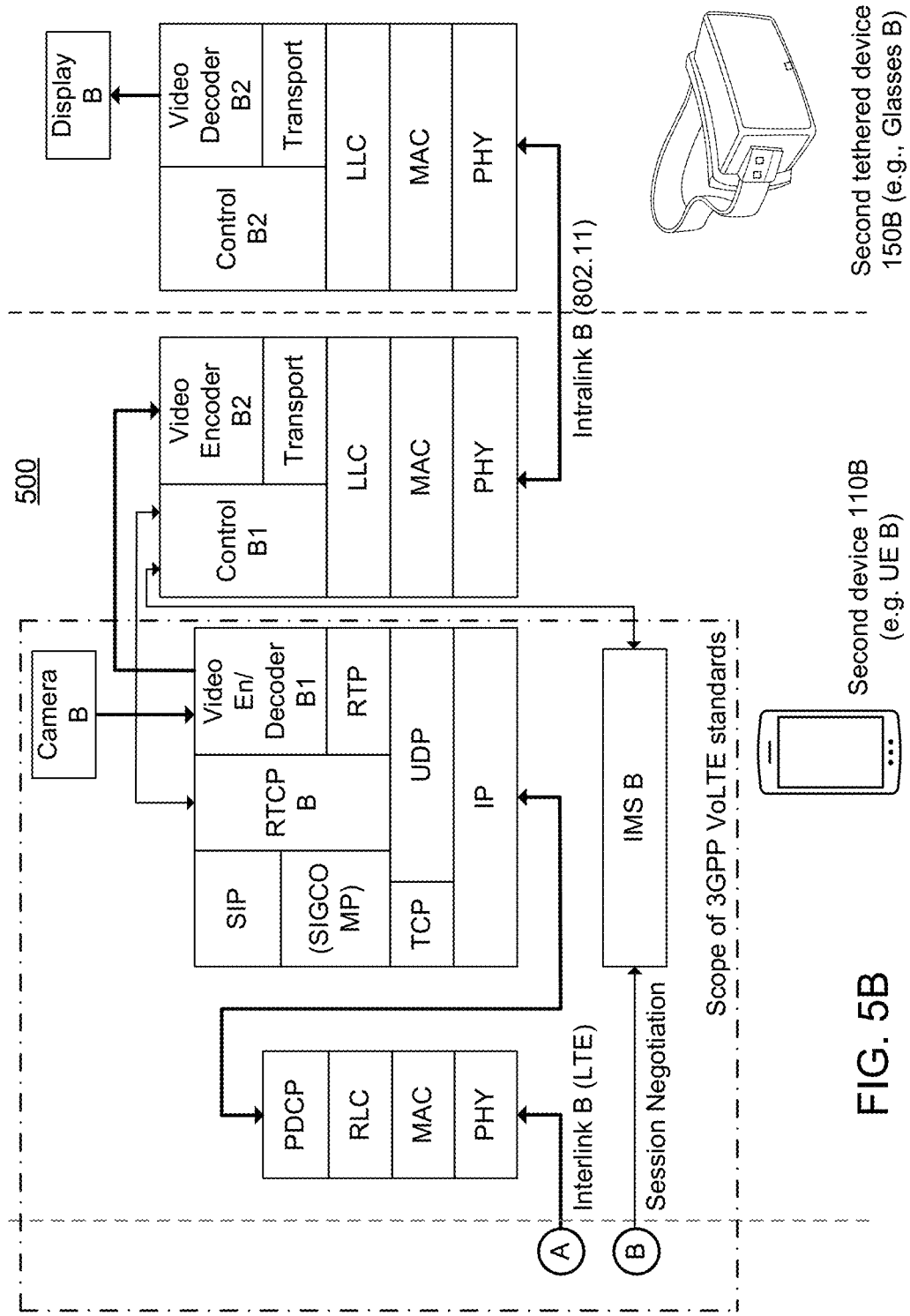

Referring to FIGS. 5A-5B, depicted is a block diagram of one example embodiment of a system 500 for negotiating details of a session and/or adapting media information (e.g., bit rate, video resolution, and/or other information of the media). FIGS. 5A-5B illustrate separate parts of the system 500. The circled letters at one end of a line/connector (e.g., a circled letter "A" and a circled letter "B") indicate corresponding connections or continuations between lines across FIGS. 5A-5B. The system 500 includes a novel approach/implementation for adapting media information (e.g., using RTCP packets) and/or negotiating the details of a session (e.g., using IP multimedia subsystem (IMS) framework) according to (or based on) a channel quality of at least one wireless channel (e.g., non-QoS area) between a device 110 (e.g., UE) and a tethered device 150 (e.g., HWD 150). In certain embodiments, the systems and methods can coordinate/configure the operation of the wireless channel(s) and/or the connection(s) (e.g., connection between devices 110) during real-time media services (e.g., video services). Furthermore, said systems and methods may configure, adjust, and/or modify a media configuration and/or a media encoding of the connection(s) (e.g., QoS area) to adapt to the environment/performance of the wireless channel(s) (e.g., non-QoS areas).

As with system 400, system 500 may include one or more devices 110 (e.g., a first device 110A and/or a second device 110B) and/or one or more tethered devices 150 (e.g., a first tethered device 150A and/or a second tethered device 150B). Each device 110 (e.g., a UE) may communicate with a tethered device 150 (e.g., a HWD 150) via a wireless channel in an unlicensed spectrum (e.g., intralink). The wireless channel(s) may include or correspond to a channel for cellular, WLAN, narrowband (e.g., Bluetooth and/or BLE) and/or UWB communications (and/or other communication standards). In some embodiments, the first device 110A and the second device 110B may communicate with each other via a connection that is, at least partially, across a licensed spectrum (e.g., interlink). The connection may include or correspond to a channel/link for voice over long term evolution (VoLTE) communications and/or other communication standards. In some embodiments, the connection may be, at least partially, across an IP backbone. The thinner solid arrows in the diagram of FIG. 5 indicate the flow of control signals/information across the system 500. The thicker solid arrows in the diagram of FIG. 5 indicate the flow of media and/or control signals/information across the system 500. In some embodiments, the first device 110A can capture/acquire/obtain certain media, such as video data, augmented reality data and/or virtual reality data. The first device 110A can compress and/or transmit the captured media to the second device 110B. Once the second device 110A receives the acquired media, the media can be displayed/shown in the second tethered device 150B.

Figure 6A:
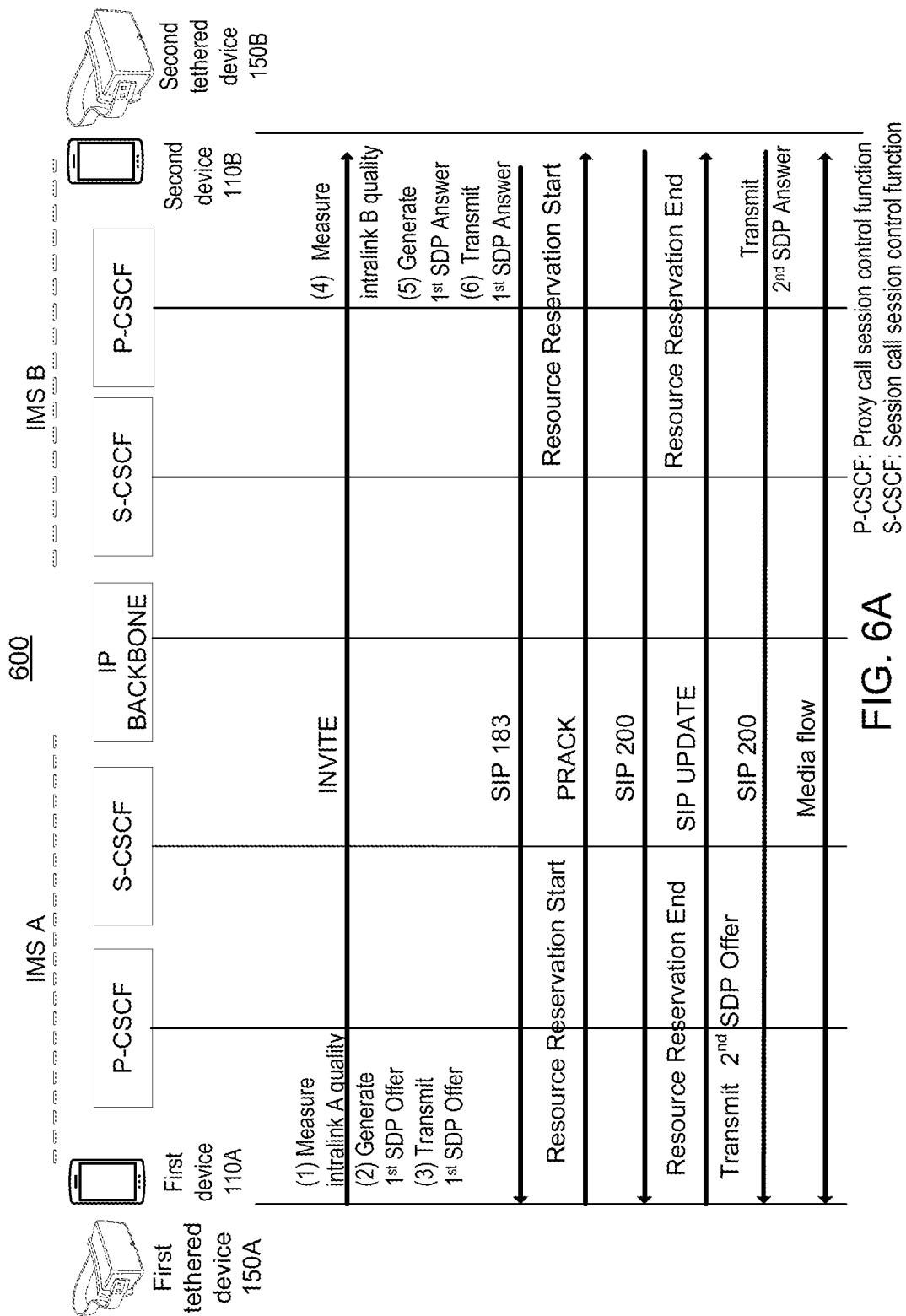
FIG. 6A is a communication diagram of a process for negotiating details of a session, according to an example implementation of the present disclosure.

Referring now to FIG. 6A, depicted is a communication diagram of an embodiment of a process 600 for negotiating details of a session and/or adapting media information. In accordance with process 600, a first device 110A may determine and/or measure the channel quality of the wireless channel between the first device 110A and the first tethered device 150A. According to the determined channel quality, the first device 110A may generate and/or construct an offer message (e.g., SDP offer) with an offered bit rate (and/or other media information). The offered bit rate may comprise a lower of a first bit rate or a second bit rate. The first bit rate can be supportable by the wireless channel (intralink, e.g., WLAN/Bluetooth/BLE/UWB/cellular channel) between the first device 110A and the first tethered device 150A, while the second bit rate may be supportable by the connection (e.g. the connection between the first device 110A, the network, and/or the second device 110B). If the network is LTE or 5G for instance, the first device 110A can confirm/determine the second bit rate for uplink and/or downlink of the connection, using a recommended bit rate indicated via Media Access Control (MAC) Control Entity (CE) signaling for example.

In some embodiments, the first device 110A may send, transmit, provide, and/or indicate the offer message to the second device 110B. Responsive to receiving the offer message, the second device 110B may determine and/or measure the channel quality of the wireless channel between the second device 110B and the second tethered device 150B. Based on the determined channel quality, and/or the bit rate that can be supportable by a wireless channel between the second device 110B and the network, the second device 110B may generate and/or construct a reply message (e.g., SDP answer) with a reply bit rate (and/or other media information). The reply bit rate may be less than or equal to the offered bit rate (e.g., supportable by both wireless channels). In some embodiments, the second device 110B may send, transmit, provide, and/or indicate the reply message to the first device 110A. Responsive to receiving the reply message, the first device 110A and/or the second device 110B may apply the reply bit rate to wireless communication across the first tethered device 150A, the first device 110A, the second tethered device 150B, and/or the second device 110B. In some embodiments, the offer message(s) and/or the reply message(s) can be exchanged/communicated according to an IMS session negotiation procedure.

Figures 6B, 6C:
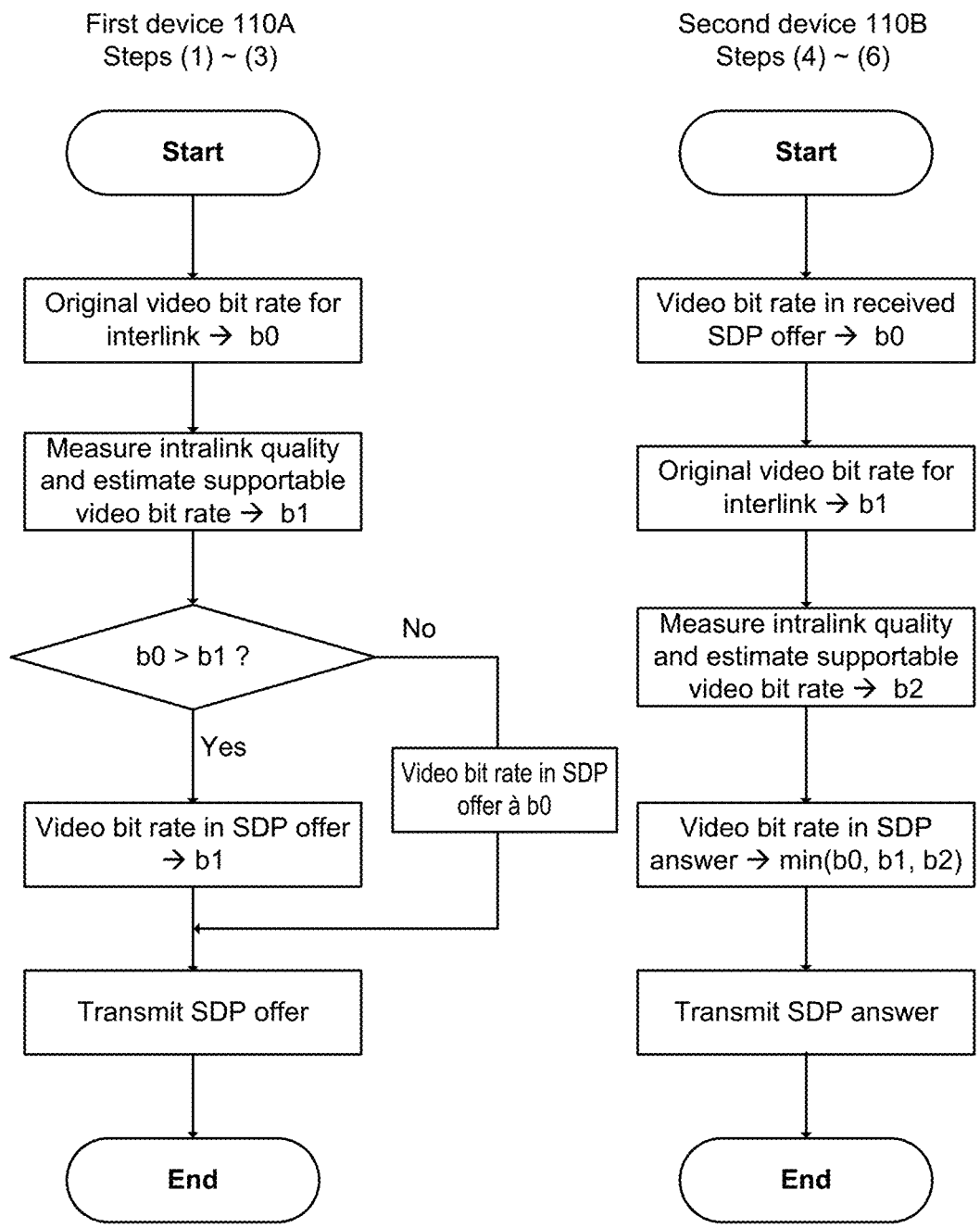
FIG. 6B is a flowchart showing a process for negotiating details of a session, according to an example implementation of the present disclosure.
FIG. 6C is a flowchart showing a process for negotiating details of a session, according to an example implementation of the present disclosure.

Referring now to FIG. 6B, depicted is a flow diagram of an embodiment of a process 600 for negotiating the details of a session. In accordance with process 600, a first device 110A may determine an original video bit rate b0 (e.g., a second bit rate) and/or other media information supportable by the connection between the first device 110A and the second device 110B (e.g., QoS area). The first device 110A may determine and/or measure the channel quality of the wireless channel between the first device 110A and the first tethered device 150A (e.g., non-QoS area). In some embodiments, the first device 110A may determine/estimate a first bit rate b1 (and/or other media information) supportable by the wireless channel between the first device 110A and the first tethered device 150A (e.g., according to the determined channel quality). If the first bit rate is lower than the second bit rate (b1<b0), the first device 110A may include the first bit rate (b1) in the offer message (e.g., SDP offer). If the second bit rate is lower than the first bit rate (b0<b1), the first device 110A may include the second bit rate (b0) in the offer message. In some embodiments, the first device 110A may send, transmit, and/or provide the offer message with the offered bit rate (e.g., the lower of the first bit rate or the second bit rate) to the second device 110B.

Referring now to FIG. 6C, depicted is a flow diagram of an embodiment of the process 600 for negotiating details of a session. In accordance with process 600, a second device 110B may identify and/or determine the offered bit rate (b0) according to the received offer message. Responsive to receiving the offer message, the second device 110B may determine the original bit rate b1 (e.g., second bit rate) supportable by the connection between the first device 110A and the second device 110B (e.g., QoS area). The second device 110B may determine and/or measure the channel quality of the wireless channel between the second device 110B and the second tethered device 150B (e.g., non-QoS area). In some embodiments, the second device 110B may determine/estimate another first bit rate b2 (and/or other media information) supportable by the wireless channel between the second device 110B and the second tethered device 150B (e.g., according to the determined channel quality). Responsive to estimating the another first bit rate, the second device 110B may determine the reply bit rate. The reply bit rate may be the lower of the offered bit rate (e.g., received via the offer message), the another first bit rate, or the second bit rate (e.g., min (b0, b1, b2)). Upon determining the reply bit rate, the second device 110B may transmit, send, and/or provide a reply message (e.g., SDP answer) with the reply bit rate to the first device 110A.

Referring to FIG. 7A, depicted is a block diagram of one example embodiment of a header 700 (e.g., real-time transport protocol (RTP) header) that can be used for determining, measuring, and/or estimating the channel quality of a wireless channel between a device 110 and a tethered device 150. After session negotiation (e.g., when media packets are being communicated/exchanged across one or more devices 110 and/or tethered devices 150), the first and/or second device 110A, 110B can determine and/or measure the channel quality of a wireless channel according to (or based on) an amount of undelivered or dropped packets between a device 110 and a tethered device 150. For instance, the first device 110A may use the sequence number of an RTP header to determine the amount of undelivered or dropped packets. A large difference/gap between the sequence numbers of consecutive RTP headers (or other headers) may indicate (or correspond to) an increased amount of undelivered/dropped packets. An increased amount of undelivered/dropped packets may indicate a poor channel quality (e.g., poor QoS). In comparison, a small (or null) amount of undelivered/dropped packets may indicate an adequate channel quality (e.g., adequate QoS).

Figure 8A:
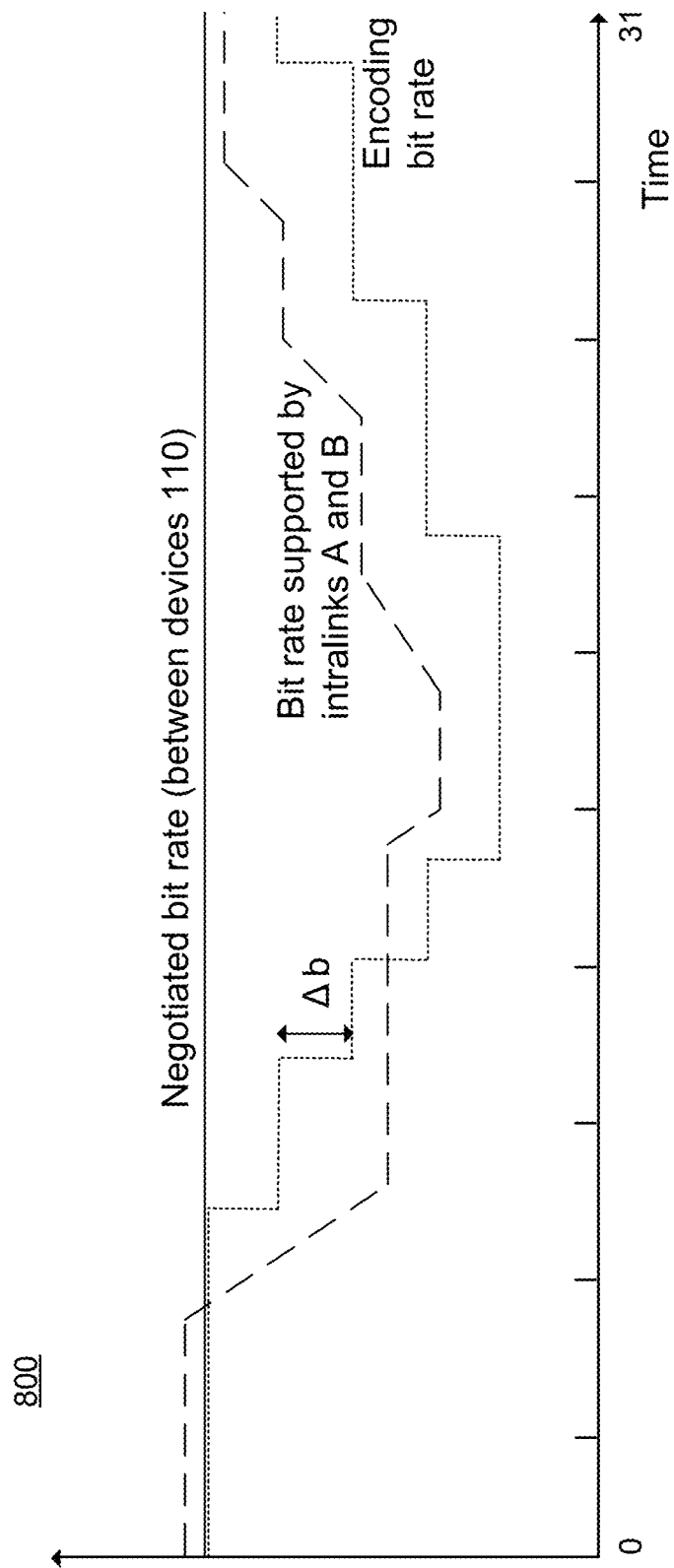
FIG. 8A is a graph of a negotiated bit rate, a bit rate supported by wireless channels, and/or an encoding bit rate across a time, according to an example implementation of the present disclosure.

FIG. 8A illustrates a graph 800 of a negotiated bit rate, a bit rate supported by wireless channels between devices 110 and tethered devices 150, and/or an encoding bit rate, according to an example embodiment. The negotiated bit rate may include or correspond to a bit rate negotiated by a first device 110A and a second device 110B, for example, at the onset of a session (e.g., before services start). The bit rate supported by the wireless channels (e.g., bit rate supported by intralinks A and B) may be determined (e.g., by the first device 110A and/or the second device 110B) according to a channel quality of at least one wireless channel, for instance. The encoding bit rate may include or correspond to an actual bit rate applied and/or used for wireless communication between the devices 110 and/or tethered devices 150.

In accordance with graph 800, if the channel quality of at least one wireless channel changes (e.g., degrades or improves) during a session, the media information (e.g., bit rate) supportable by the wireless channels (e.g., intralink A and/or intralink B) can change (e.g., decrease or increase) accordingly. For instance, a decrease in channel quality of the wireless channel between the second device 110B and the second tethered device 150B can result in a reduction of the bit rate (and/or other media information) supportable by said wireless channel. As such, the devices 110 can adjust, negotiate, and/or adapt the media information (e.g., encoding bit rate) according to (or based on) the change(s) in channel quality. In one example, if the quality of at least one wireless channel (e.g., the wireless channel between the first device 110a and the first tethered device 150A) degrades during a session, a first device 110A can send and/or transmit a request (e.g., a temporary maximum media bit-rate request message (TMMBR), as shown in FIG. 7B, embedded in a RTCP packet) to the second device 110B. The request may include or correspond to a request to reduce a video bit rate (or other media information) according to a decrease in channel quality of the at least one wireless channel. In another example, if the channel quality of at least one wireless channel (e.g., wireless channel between the first device 110A and the first tethered device 150A) is worse than a channel quality of a connection between devices 110 (e.g., end-to-end (E2E) link), the first device 110A (or other devices 110) may send/transmit a request to reduce a video bit rate (or other media information) to the second device 110B (or other devices 110).

Figure 8B:
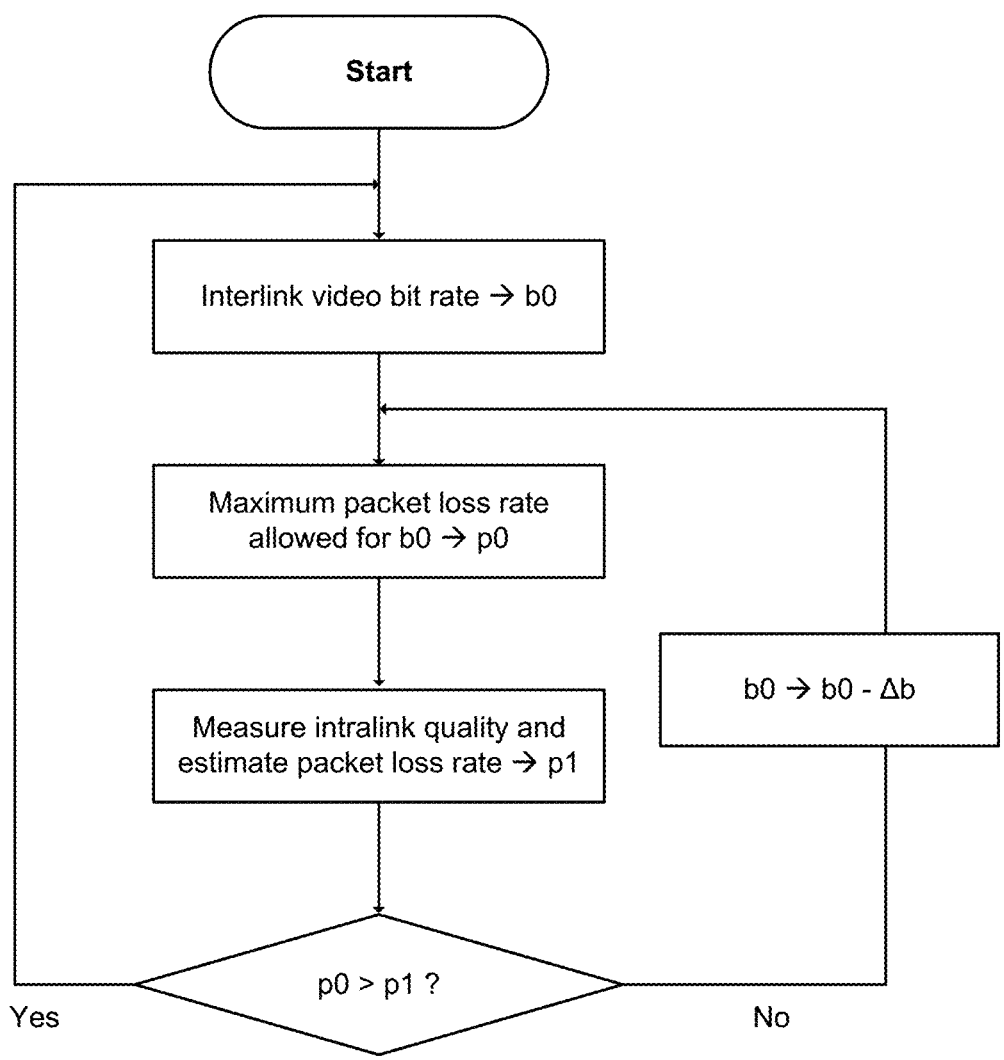
FIG. 8B is a flowchart showing a process for adapting media information during a session according to a channel quality of a wireless channel, according to an example implementation of the present disclosure.

FIG. 8B is a flow diagram of one embodiment of a process 850 for adapting media information (e.g. a bit rate) during a session according to (or based on) a channel quality of a wireless channel between a device 110 and a tethered device 150. In accordance with process 800, a first device 110A (and/or a second device 110B) may determine, negotiate, measure, and/or identify a second bit rate (b0) and/or other media information (e.g., video resolution). The second bit rate (e.g., negotiated bit rate) may include or correspond to a bit rate supportable by a connection between the first device 110A and the second device 110B that is, at least partially, across/using a licensed spectrum. In some embodiments, the first device 110A (and/or the second device 110B) may determine a maximum rate of packet loss p0 (e.g., the maximum rate at which packets can be dropped/undelivered), according to (or based on) the second bit rate.

That is, the second bit rate may determine the maximum rate at which packet loss can be tolerated during a session (e.g., session between one or more devices 110 and/or one or more tethered devices 150).

In some embodiments, the first device 110A (and/or the second device 110B) may measure/determine the channel quality of at least one wireless channel. For instance, the first device 110A may determine the channel quality of the wireless channel between the first device 110A and the first tethered device 150A. In another example, the second device 110B may determine the channel quality of the wireless channel between the second device 110B and the second tethered device 150B. According to the determined channel quality, the first device 110A (and/or the second device 110B) may determine/estimate a rate of packet loss (p1) corresponding to (or associated with) the wireless channel. If the rate of packet loss is lower than the maximum rate of packet loss (p1<p0), the first device 110A (and/or the second device 110B) may determine to maintain a same second bit rate. If, however, the rate of packet loss exceeds the maximum rate of packet loss (p1>p0), the first device 110A (and/or the second device 110B) may adjust, modify, and/or adapt the second bit rate. For instance, the first device 110A (and/or the second device 110B) may adjust the second bit rate to a bit rate that causes the rate of packet loss to be lower than the maximum rate of packet loss. In some embodiments, the first device 110A (and/or the second device 110B) can modify the second bit rate according to (or based on) a predetermined/preconfigured and/or adjustable amount of change in bit rate (e.g., Ab).

Figure 9:
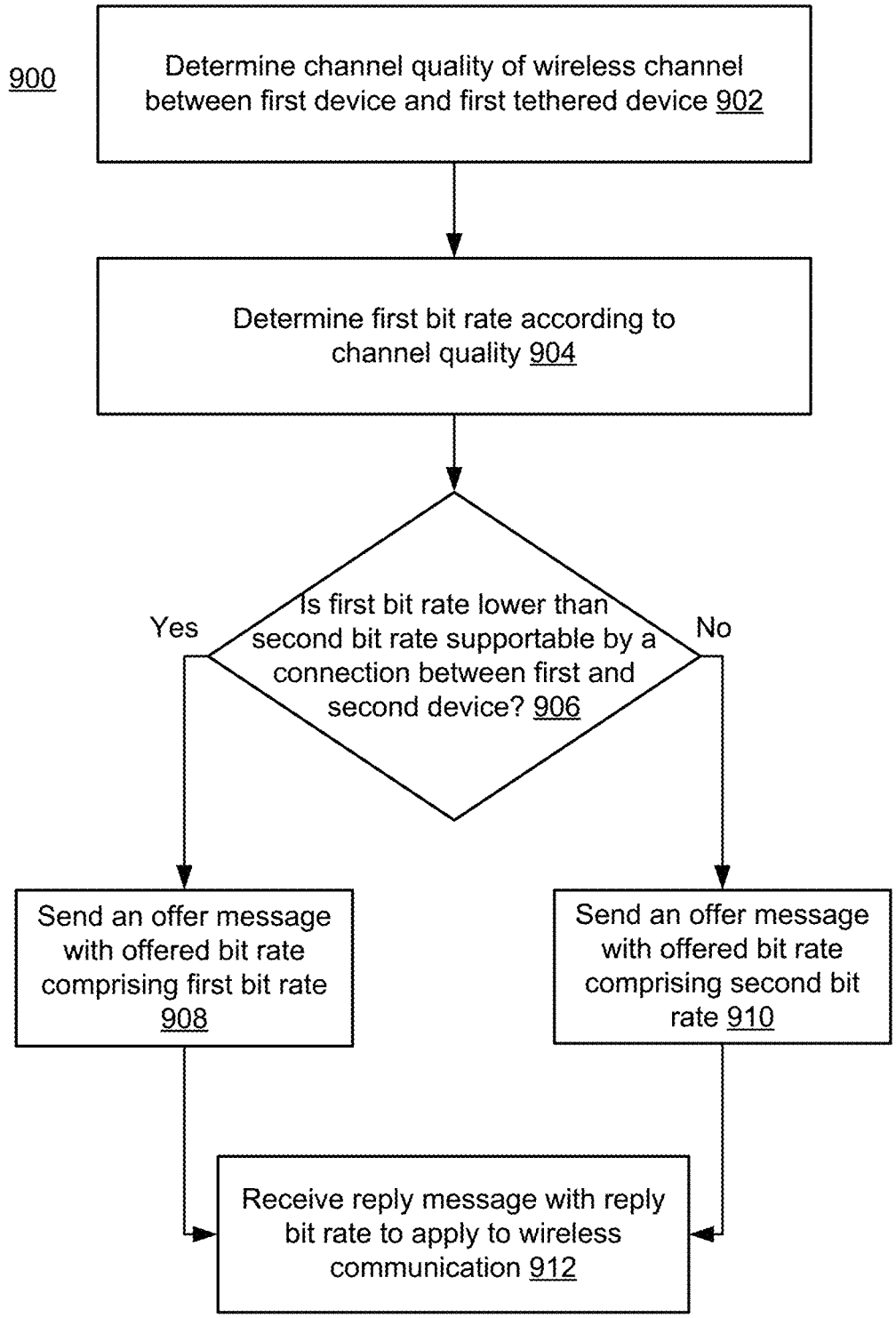
FIG. 9 is a flowchart showing a process for negotiating details of a session, according to an example implementation of the present disclosure.

FIG. 9 is a flow diagram of one embodiment of a process 900 for negotiating/adapting the media information (e.g., media bit rate) of the session (e.g., a session between at least one device 110 and at least one tethered device 150), according to an example implementation of the present disclosure. The functionalities of the process 900 may be implemented using, or performed by, the components detailed herein in connection with FIGS. 1-8B. In some embodiments, the process 900 can be performed by the computing device 110, such as a first device 110A and/or a second device 110B. In some embodiments, the process 900 can be performed by other entities, such as an access point 105 and/or a HWD 150 (or other tethered devices 150). In some embodiments, the process 900 may include more, fewer, or different steps than shown in FIG. 9.

In brief overview, a first device 110A may determine a channel quality of a wireless channel between the first device 110A and the first tethered device 150A (902). The first device 110A may determine a first bit rate according to the channel quality (904). The first device 110A may determine whether the first bit rate is lower than a second bit rate that is supportable by a connection between the first device 110A and the second device 110B (906). If the first bit rate is lower than the second bit rate, the first device 110A may send an offer message with an offered bit rate comprising the first bit rate (908). If the second bit rate is lower than the first bit rate, the first device 110A may send the offer message with the offered bit rate comprising the second bit rate (910). The first device 110A may receive a reply message with a reply bit rate to apply to a wireless communication (912).

Referring now to operation (902), and in some embodiments, a first device 110A (e.g., a first UE) may determine, identify, and/or calculate a channel quality (and/or other channel properties, such as channel bandwidth) of at least one wireless channel (e.g., a channel for WLAN, Bluetooth, BLE, and/or UWB communications). The wireless channel (s) (e.g., intralink) may be in an unlicensed spectrum, and therefore, can be unable to meet/support a certain level of QoS (e.g., a level of QoS supportable by a connection/channel in a licensed spectrum). The wireless channel(s) may be between at least one device 110 and at least one tethered device 150. For example, the wireless channel(s) may include or correspond to a wireless channel in an unlicensed spectrum (e.g., Bluetooth) between the first device 110A (e.g., computing device such as a 5G phone) and the first tethered device 150A (e.g., glasses and/or HWD 150A, for AR/VR application for instance). In some embodiments, the at least one wireless channel may comprise a channel for cellular, wireless local area network (WLAN), narrowband (e.g., Bluetooth and/or BLE) and/or ultra-wideband (UWB) communications.

In some embodiments, the first device 110 may determine the channel quality of at least one wireless channel according to (or based on) jitter (e.g., beacon jitter). For instance, the first device 110 may determine the jitter of at least one beacon signal between the first device 110A and the first tethered device 150A. In some embodiments, the first device 110A may use the determined jitter to determine a saturation of a channel, according to (or based on) a distribution (e.g., a variance of a distribution) of jitter measurements. In some embodiments, the first device 110A may determine the channel quality of at least one wireless channel according to (or based on) an amount of undelivered and/or dropped packets (e.g., media packets) between the first device 110A and the first tethered device 150A. For example, the first device 110A may determine an amount/number of undelivered and/or dropped packets according to (or by using) a sequence number of a real-time transport protocol (RTP) header (and/or sequence numbers from other network protocols). An increasing amount of missing/omitted sequence numbers can indicate an increasing amount of undelivered and/or dropped packets, and therefore, a degrading channel quality (e.g., loss in channel quality).

According to the determined channel quality of the at least one wireless channel, the first device 110A may determine and/or calculate a first bit rate and/or other media information (e.g., media resolution, media type, media coding, and/or other media information) (904). The first bit rate can be supportable (e.g., can be applied to wireless communication without degrading performance of a system) on the at least one wireless channel. For instance, as the channel quality increases above a predetermined level (e.g., increase in channel quality), the first device 110A may determine that an increasingly larger bit rate (e.g., first bit rate) is supported by the wireless channel. In comparison, as the channel quality decreases below said predetermined level (e.g., loss in channel quality), the first device 110A may determine that an increasingly smaller bit rate (e.g., first bit rate) is supported by the wireless channel. In some embodiments, the first bit rate of a first wireless channel (e.g., a wireless channel between a first device 110A and a first tethered device 150A) may correspond to (e.g., matches or is within a defined range/extent of) a bit rate supportable by a second wireless channel (e.g., a wireless channel between a second device 110A and a second tethered device 150A).

Referring now to operation (906), and in some embodiments, the first device 110A may determine whether the first bit rate (or other media information) is lower than a second bit rate (or other media information). For instance, the first device 110A may compare the value of the first bit rate (e.g., 1,800 kbps) with the value of the second bit rate (e.g., 3,000 kbps), and determine that the second bit rate is higher (or in some embodiments, lower) than the first bit rate. The second bit rate (or other media information, such as video resolution) may include or correspond to a bit rate (or other media information) that is supportable by a connection/link between at least the first device 110A and the second device 110A. In some embodiments, the connection between the first device 110A and the second device 110B may be, at least partially, across a licensed spectrum (e.g., interlink). For instance, the connection (e.g., between the first device 110A and the second device 110B) may include or correspond to a connection across a licensed wireless spectrum (e.g., licensed 5G spectrum) and a backbone of an internet protocol (IP) network.

Responsive to determining the lower of the first bit rate or the second bit rate, the first device 110A may send, transmit, communicate, and/or broadcast an offer message (e.g., an SDP offer, and/or other messages from other protocols) to a second device 110A (908 and 910). The offer message may include, provide, specify, and/or indicate an offered bit rate and/or other media information (e.g., offer media type, offer media resolution, and/or offer media coding). If the first bit rate is lower than the second bit rate, the offered bit rate may include or correspond to the first bit rate (908). If the second bit rate is lower than the first bit rate, the offered bit rate may include or correspond to the second bit rate (910). Via the offer message, the first device 110A can inform/report to the second device 110B that the communication (e.g., wireless and/or wired communication) across the first device 110A, the first tethered device 150A, and/or the second device 110A can support (e.g., according to the channel quality of the wireless channel and/or the connection) a bit rate (or other media information) that is less than or equal to the offered bit rate.

Referring now to operation (912), and in some embodiments, the first device 110A may receive and/or obtain a reply message (e.g., an SDP answer, and/or other messages from other protocols) from the second device 110B. The reply message may include, provide, specify, and/or indicate a reply bit rate and/or other media information (e.g., a reply video resolution). The information included in the reply message may indicate and/or specify a bit rate (and/or other media information) that is supported/supportable by a communication (e.g., wireless and/or wired communication) across at least the first device 110A and the first tethered device 150A (e.g., a first wireless channel), the first device 110A and the second device 110B (e.g., a connection, at least partially, across a licensed spectrum), and/or the second device 110A and the second tethered device 150B (e.g., a second wireless channel). As such, the reply bit rate may comprise a lower of: the offered bit rate, and/or a bit rate supportable on the wireless channel (e.g., intralink) in the unlicensed spectrum between the second device 110B and the second tethered device 150B. The information included in the reply message can be determined according to (or based on) a channel quality of the wireless channel(s) (e.g., intralink) and/or a channel quality of the connection(s) between device(s) 110 (e.g., interlink). As such, the reply bit rate may be less than or equal to the offered bit rate. In some embodiments, the reply bit rate can be applied to (e.g., can be supportable by) wireless communication across at least the first tethered device 150A, the first device 110A, and/or the second device 110B. In some embodiments, the first bit rate, the offered bit rate and/or the reply bit rate may comprise a bit rate for communicating at least one of: video data, augmented reality data, virtual reality data, and/or other data/media.

In some embodiments, the first device 110A may receive and/or obtain another offer message (e.g., SDP offer) from the second device 110B. For instance, the second device 110B may send, transmit, and/or communicate another offer message to the first device 110A responsive to determining/detecting a change (e.g., increase or decrease) in the channel quality of the wireless channel between the second device 110B and the second tethered device 150B. As such, the another offer message may include, provide, and/or specify another offered bit rate (or other media information), wherein the another offered bit rate is supportable by the wireless channel between the second device 110B and the second tethered device 150B (e.g., given the change in channel quality). Responsive to receiving the another offer message, the first device 110A may send/transmit another reply message (e.g., SDP answer) to the second device 110B. The another reply message may include and/or provide another reply bit rate (or other media information, such as a video resolution) that is less than or equal to the another offered bit rate (e.g., supportable by the wireless channel between the first device 110A and the first tethered device 150A). As such, the another reply bit rate is supportable by, and therefore can be applied to, the wireless communication across the first device 110A, the second device 110B, the first tethered device 150A, and/or the second tethered device 150B.

In some embodiments, the first device 110A may determine an updated bit rate (e.g., updated according to a change in channel quality) supportable on the wireless channel between the first device 110A and the first tethered device 150A. As such, the first device 110A may determine the another reply bit rate (e.g., included in the another reply message sent by the first device 110A) as a lower of: the updated bit rate, the another offered bit rate, and/or the second bit rate (e.g., supportable by the connection between the first device 110A and the second device 110B). Responsive to determining that the another reply bit rate is a lower of the updated bit rate, the another offered bit rater, and/or the second bit rate, the another reply bit rate can be applied to, and therefore is supportable (e.g., the communication (e.g., wireless communication) across/among the first device 110A, the second device 110B, the first tethered device 150A, and/or the second tethered device 150B.

Figure 10:
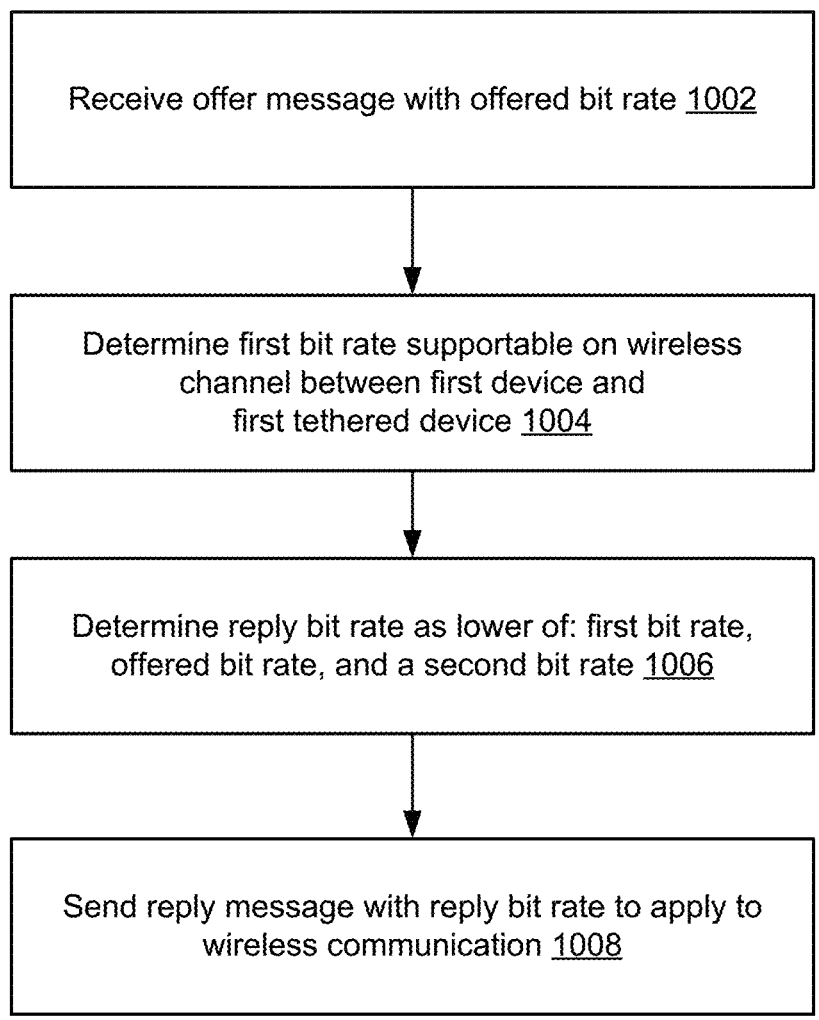
FIG. 10 is a flowchart showing a process for negotiating the details of a session, according to an example implementation of the present disclosure.

FIG. 10 is a flow diagram of one embodiment of a process 1000 for negotiating/adapting the media information (e.g., media bit rate) of the session (e.g., a session between at least one device 110 and at least one tethered device 150), according to an example implementation of the present disclosure. The functionalities of the process 1000 may be implemented using, or performed by, the components detailed herein in connection with FIGS. 1-8B. In some embodiments, the process 1000 can be performed by the computing device 110, such as a first device 110A and/or a second device 110B. In some embodiments, the process 1000 can be performed by other entities, such as an access point 105 and/or a HWD 150 (or other tethered devices 150). In some embodiments, the process 1000 may include more, fewer, or different steps than shown in FIG. 10.

In brief overview, a first device 110A may receive an offer message with an offered bit rate (1002). The first device 110A may determine a first bit rate that is supportable on a wireless channel between the first device 110A and a first tethered device 150A (1004). The first device 110A may determine a reply bit rate as a lower of: the first bit rate, the offered bit rate, and a second bit rate (1006). The first device 110A may send a reply message with the reply bit rate to apply to a wireless communication (1008).

Referring now to operation (1002), and in some embodiments, a first device 110A (e.g., a first UE) may receive and/or obtain an offer message (e.g., an SDP offer, and/or other messages from other protocols) from a second device 110B. For instance, the second device 110B may send, transmit, and/or communicate the offer message responsive to a change in channel quality (e.g., the second device detecting/determining the change in channel quality) of the wireless channel (e.g., intralink) between the second device 110B and the second tethered device 150B. The offer message may include, provide, and/or indicate an offered bit rate (e.g., a bit rate supportable on the wireless channel between the second device 110B and the second tethered device 150B) and/or other media information, such as a video resolution.

Referring now to operation (1004), and in some embodiments, the first device 110A may determine/identify a first bit rate (or other media information). For instance, responsive to receiving the offer message, the first device 110A may determine the first bit rate, wherein the first bit rate can be supportable on the wireless channel (e.g., intralink) between the first device 110A and the first tethered device 150A. In some embodiments, the first device 110A may determine the first bit rate (or other media information) according to (or based on) the channel quality of the wireless channel (e.g., higher channel quality results in larger bit rate). In some embodiments, the first device 110A can determine and/or compute the channel quality according to (or based on) a determined jitter. For example, the first device 110A can determine the jitter of at least one beacon signal between the first device 110A and the first tethered device 150A. In some embodiments, the first device 110A can determine and/or compute the channel quality of the wireless channel according to a determined amount of undelivered and/or dropped packets (e.g. media packets). For instance, the first device 110A can determine the amount of undelivered and/or dropped packets between the first device 110A and the first tethered device 150A. The wireless channel can be in an unlicensed spectrum (e.g., unlicensed next generation (NG) spectrum). In some embodiments, the wireless channel may comprise a channel for cellular, WLAN, narrowband (e.g., Bluetooth and/or BLE), and/or UWB communications.

Referring now to operation (1006), and in some embodiments, the first device 110A may determine, identify, and/or calculate a reply bit rate (and/or other media information). For example, responsive to determining the first bit rate, the first device 110A may determine the reply bit rate. The first device 110 may determine the reply bit rate as a lower of: the first bit rate, the offered bit rate, and/or a second bit rate. The second bit rate may be supportable by (and therefore can be applied to) a connection between the first device 110A and the second device 110B that is, at least partially, across a licensed spectrum (e.g., NG licensed spectrum). As such, the reply bit rate may be supportable on the wireless channel between the first device 110A and the first tethered device 150A, the wireless channel between the second device 110A and the second tethered device 150B, and/or the connection between the first device 110A and the second device 110B.

In some embodiments, the first device 110A may determine and/or identify an updated bit rate (and/or other media information) supportable on the wireless channel between the first device 110A and the first tethered device 150A. For example, the first device 110A may determine the updated bit rate responsive to a change in the channel quality of said wireless channel (e.g., intralink). Upon determining the updated bit rate, the first device 110A may determine another offered bit rate. The another offered bit rate can be determined as a lower of: the updated bit rate and/or the second bit rate (e.g., supportable by the connection between the first device 110A and the second device 110B). In some embodiments, the first device 110A may send and/or transmit the another offered bit rate to the second device 110B via the another offer message (e.g., SDP offer). Responsive to sending the another offer message, the first device 110A may receive a reply message (e.g., another reply message) from the second device 110B. The reply message (e.g., another reply message) may include and/or provide a reply bit rate (e.g., another reply bit rate) and/or other media information. The reply bit rate can be supportable by (e.g., applied to) the wireless channel between the second device 110B and the second tethered device 150B. The reply bit rate (e.g., another reply bit rate) can be less than or equal to the another offered bit rate. As such, the reply bit rate may be supportable by both the wireless channel between the second device 110B and the second tethered device 150B, and the wireless channel between the first device 110A and the first tethered device 150A. In some embodiments, the reply bit rate (e.g., another reply bit rate) may be applied to, and therefore is supportable by, wireless communication across at least the first tethered device 150A, the first device 110A, and/or the second device 110B.

Referring now to operation (1008), and in some embodiments, the first device 110A may send, transmit, and/or communicate a reply message (e.g., a SDP answer) to the second device 110B. For example, responsive to a determination of the reply bit rate, the second device 110B may receive the reply message from the first device 110A. The reply message may include, provide, specify, and/or indicate the determined reply bit rate and/or other media information, such as a reply video resolution. The information provided by the reply message (e.g., the reply bit rate) may be applied to wireless communication across at least the first tethered device 150A, the first device 110A, and/or the second device 110B. In some embodiments, the first bit rate, the offered bit rate and/or the reply bit rate may comprise a bit rate for communicating at least one of: video data, augmented reality data, virtual reality data, and/or other data/content/ media.

In some embodiments, the first device 110A may receive and/or obtain another offer message with another offered bit rate from the second device 110B. For instance, responsive to a change in channel quality of the wireless channel between the second device 110B and the second tethered device 150B, the second device 110B may send the another offer message (e.g., with the another offered bit rate supportable by the wireless channel) to the first device 110A. Upon receiving the another offer message, the first device 110A may send/transmit another reply message to the second device 110B. The another reply message can have/include another reply bit rate and/or other media information, wherein the another reply bit rate is less than or equal to the another offered bit rate. In some embodiments, the first device 110A may determine an updated bit rate (and/or other media information) supportable on the wireless channel between the first device 110A and the first tethered device 150A. The updated bit rate may be determined according to, based on, and/or responsive to a change (e.g., increase and/or decrease) in the channel quality of said wireless channel. Upon determining the updated bit rate, the first device 110A may determine the another reply bit rate as a lower of: the updated bit rate, the another offered bit rate, and/or the second bit rate (e.g., supportable by the connection between the first device 110A and the second device 110B).

Figure 11:
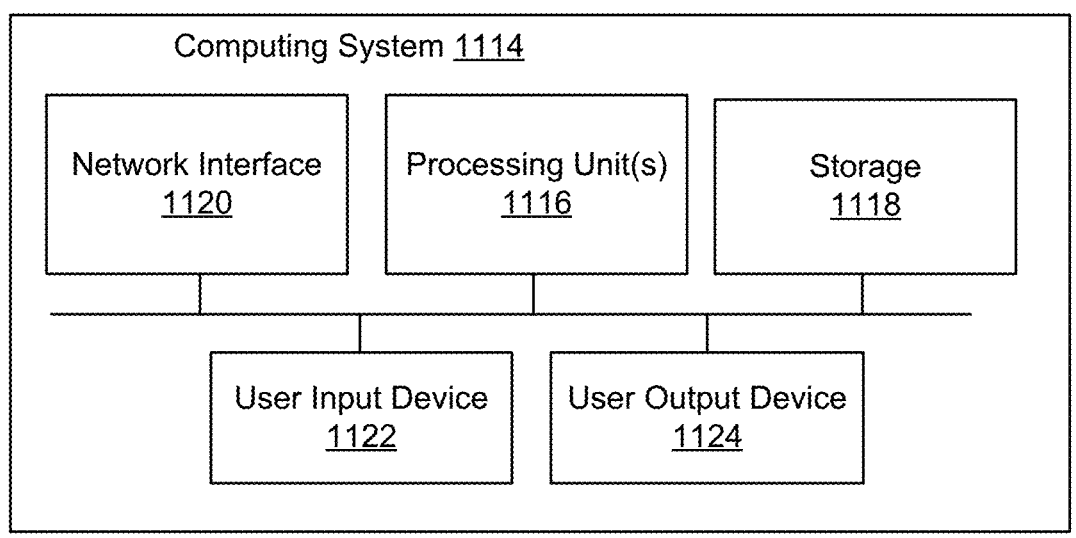
FIG. 11 is a block diagram of a computing environment, according to an example implementation of the present disclosure.

Various operations described herein can be implemented on computer systems. FIG. 11 shows a block diagram of a representative computing system 1114 usable to implement the present disclosure. In some embodiments, the computing device 110, the HWD 150 or both of FIG. 1 are implemented by the computing system 1114. Computing system 1114 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 1114 can be implemented to provide VR, AR, MR experience.

In some embodiments, the computing system 1114 can include conventional computer components such as processors 1116, storage device 1118, network interface 1120, user input device 1122, and user output device 1124.

Network interface 1120 can provide a connection to a wide area network (e.g., the Internet) to which WAN interface of a remote server system is also connected. Network interface 1120 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 1122 can include any device (or devices) via which a user can provide signals to computing system 1114; computing system 1114 can interpret the signals as indicative of particular user requests or information. User input device 1122 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1124 can include any device via which computing system 1114 can provide information to a user. For example, user output device 1124 can include a display to display images generated by or delivered to computing system 1114. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 1124 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 1116 can provide various functionality for computing system 1114, including any of the functionality described herein as being performed by a server or client, or other functionality associated with message management services.

It will be appreciated that computing system 1114 is illustrative and that variations and modifications are possible. Computer systems used in connection with the present disclosure can have other capabilities not specifically described here. Further, while computing system 1114 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a first device, a channel quality of a wireless channel in an unlicensed spectrum between the first device and a first tethered device;
   determining, by the first device, a first bit rate supportable on the wireless channel according to the channel quality;
   comparing, by the first device, the first bit rate with a second bit rate supportable by a connection between the first device and the second device that is at least partially across a licensed spectrum to determine a lower of the first bit rate or a second bit rate;
   sending, by the first device to a second device, an offer message with an offered bit rate comprising the lower of the first bit rate or the second bit rate; and
   receiving, by the first device from the second device, a reply message with a reply bit rate that is less than or equal to the offered bit rate, to apply to wireless communication across at least the first tethered device, the first device and the second device.

2. The method of claim 1, wherein determining the channel quality comprises:
   determining, by the first device, jitter of at least one beacon signal between the first device and the first tethered device, or
   determining, by the first device, an amount of undelivered or dropped packets between the first device and the first tethered device.

3. The method of claim 1, wherein the wireless channel comprises a channel for cellular, wireless local area network (WLAN), narrowband or ultra-wideband (UWB) communications.

4. The method of claim 1, wherein the first bit rate, the offered bit rate or the reply bit rate comprises a bit rate for communicating at least one of: video data, augmented reality data or virtual reality data.

5. The method of claim 1, wherein the reply bit rate comprises a lower of: the offered bit rate, or a bit rate supportable on a wireless channel in the unlicensed spectrum between the second device and a second tethered device.

6. The method of claim 1, comprising:
   receiving, by the first device from the second device, another offer message with another offered bit rate;
   sending, by the first device to the second device, another reply message with another reply bit rate that is less than or equal to the another offered bit rate.

7. The method of claim 6, comprising:
   determining, by the first device, an updated bit rate supportable on the wireless channel; and
   determining, by the first device, the another reply bit rate as a lower of: the updated bit rate, the another offered bit rate, or the second bit rate supportable by the connection between the first device and the second device.

8. A method comprising:
   receiving, by a first device from a second device, an offer message with an offered bit rate;
   determining, by the first device, a first bit rate supportable on a wireless channel in an unlicensed spectrum between the first device and a first tethered device;
   comparing, by the first device, the first bit rate with a second bit rate supportable by a connection between the first device and the second device that is at least partially across a licensed spectrum to determine a lower of the first bit rate or a second bit rate;
   determining, by the first device, a reply bit rate as a lower of: the first bit rate, the offered bit rate, and the second bit rate; and
   sending, by the first device to the second device, a reply message with the reply bit rate to apply to wireless communication across at least the first tethered device, the first device and the second device.

9. The method of claim 8, comprising:
   receiving, by the first device from the second device, another offer message with another offered bit rate;
   sending, by the first device to the second device, another reply message with another reply bit rate that is less than or equal to the another offered bit rate.

10. The method of claim 9, comprising:
    determining, by the first device, an updated bit rate supportable on the wireless channel; and
    determining, by the first device, the another reply bit rate as a lower of: the updated bit rate, the another offered bit rate, or the second bit rate supportable by the connection between the first device and the second device.

11. The method of claim 8, comprising:
    determining, by the first device, an updated bit rate supportable on the wireless channel; and
    determining, by the first device, another offered bit rate as a lower of: the updated bit rate, or the second bit rate supportable by the connection between the first device and the second device.

12. The method of claim 11, comprising:
    sending, by the first device to the second device, another offer message with the another offered bit rate; and
    receiving, by the first device from the second device, another reply message with another reply bit rate that is less than or equal to the another offered bit rate, to apply to wireless communication across at least the first tethered device, the first device and the second device.

13. The method of claim 8, wherein determining a channel quality comprises:

determining, by the first device, jitter of at least one beacon signal between the first device and the first tethered device, or determining, by the first device, an amount of undelivered or dropped packets between the first device and the first tethered device.

14. The method of claim 8, wherein the wireless channel comprises a channel for cellular, wireless local area network (WLAN), narrowband or ultra-wideband (UWB) communications.

15. The method of claim 8, wherein the first bit rate, the offered bit rate or the reply bit rate comprises a bit rate for communicating at least one of: video data, augmented reality data or virtual reality data.

16. A first device comprising:
at least one processor configured to:
determine a channel quality of a wireless channel in an unlicensed spectrum between the first device and a first tethered device;
determine a first bit rate supportable on the wireless channel according to the channel quality;
compare the first bit rate with a second bit rate supportable by a connection between the first device and the second device that is at least partially across a licensed spectrum to determine a lower of the first bit rate or a second bit rate;
send, to a second device, an offer message with an offered bit rate comprising the lower of the first bit rate or the second bit rate; and
receive, from the second device, a reply message with a reply bit rate that is less than or equal to the offered bit rate, to apply to wireless communication across at least the first tethered device, the first device and the second device.

17. The first device of claim 16, wherein the at least one processor is configured to determine the channel quality by:
determining jitter of at least one beacon signal between the first device and the first tethered device, or
determining an amount of undelivered or dropped packets between the first device and the first tethered device.

18. The first device of claim 16, wherein the reply bit rate comprises a lower of: the offered bit rate, or a bit rate supportable on a wireless channel in the unlicensed spectrum between the second device and a second tethered device.

19. The first device of claim 16, wherein the at least one processor is configured to:
receive, from the second device, another offer message with another offered bit rate;
send, to the second device, another reply message with another reply bit rate that is less than or equal to the another offered bit rate.

20. The first device of claim 19, wherein the at least one processor is configured to:
determine an updated bit rate supportable on the wireless channel; and
determine the another reply bit rate as a lower of: the updated bit rate, the another offered bit rate, or the second bit rate supportable by the connection between the first device and the second device.

* * * * *